(12) United States Patent
Manahan et al.

(10) Patent No.: US 10,295,439 B2
(45) Date of Patent: May 21, 2019

(54) ENCLOSURE DIAGNOSTIC AND CONTROL SYSTEMS

(71) Applicants: Joseph Michael Manahan, Manlius, NY (US); Stephan P. Iannce, Clay, NY (US); Richard E. Rothenberger, Syracuse, NY (US); John M. Bonaccio, DeWitt, NY (US); Benjamin Avery Freer, Syracuse, NY (US)

(72) Inventors: Joseph Michael Manahan, Manlius, NY (US); Stephan P. Iannce, Clay, NY (US); Richard E. Rothenberger, Syracuse, NY (US); John M. Bonaccio, DeWitt, NY (US); Benjamin Avery Freer, Syracuse, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 519 days.

(21) Appl. No.: 14/718,363

(22) Filed: May 21, 2015

(65) Prior Publication Data

US 2015/0338315 A1   Nov. 26, 2015

Related U.S. Application Data

(60) Provisional application No. 62/001,167, filed on May 21, 2014.

(51) Int. Cl.
*G01M 99/00* (2011.01)
*G08B 21/16* (2006.01)
(Continued)

(52) U.S. Cl.
CPC ........... *G01M 99/008* (2013.01); *G08B 19/00* (2013.01); *G08B 21/16* (2013.01); *G05B 23/0224* (2013.01); *G05B 23/0245* (2013.01)

(58) Field of Classification Search
None
See application file for complete search history.

(56) References Cited

U.S. PATENT DOCUMENTS

| 4,216,658 A | 8/1980 | Baker, III et al. |
| 4,704,607 A | 11/1987 | Teather et al. |

(Continued)

OTHER PUBLICATIONS

Blaine R. Copenheaver, Patent Cooperation Treaty (PCT) International Search Report for International Application No. PCT/US2009/056936, completion date Nov. 4, 2009, dated Nov. 13, 2009, 2 pages.

(Continued)

*Primary Examiner* — John C Kuan
(74) *Attorney, Agent, or Firm* — King & Spalding LLP

(57) ABSTRACT

An enclosure diagnostic and control system is described herein. The system can include a controller having a storage repository, where the storage repository includes at least one threshold value and at least one algorithm. The system can also include an enclosure communicably coupled to the controller and electrically coupled to a field device. The system can further include a number of sensors communicably coupled to the controller, where the sensors measure a number of field values of a number of parameters associated with the field device. The controller can evaluate the field values using the at least one algorithm to generate an evaluated value. The controller can output a control signal based on the evaluated value.

15 Claims, 14 Drawing Sheets

(51) Int. Cl.
*G08B 19/00* (2006.01)
*G05B 23/02* (2006.01)

(56) References Cited

U.S. PATENT DOCUMENTS

| | | |
|---|---|---|
| 5,656,996 A | 8/1997 | Houser |
| 5,659,302 A | 8/1997 | Cordier |
| 5,682,329 A * | 10/1997 | Seem ................... G01F 1/34 700/276 |
| 5,907,473 A | 5/1999 | Przilas et al. |
| 6,339,373 B1 | 1/2002 | Zeskind et al. |
| 6,975,237 B2 | 12/2005 | Barton et al. |
| 7,221,282 B1 | 5/2007 | Ross et al. |
| 7,528,612 B2 | 5/2009 | Gollhardt et al. |
| 7,989,769 B2 | 8/2011 | Brandt et al. |
| 8,570,179 B2 | 10/2013 | Holloway et al. |
| 2004/0098218 A1* | 5/2004 | Ito ........................ G01D 9/005 702/138 |
| 2007/0120695 A1* | 5/2007 | Albarado ............ B23K 26/032 340/679 |
| 2011/0118896 A1 | 5/2011 | Holloway |
| 2011/0169650 A1 | 7/2011 | Holloway et al. |
| 2011/0257897 A1* | 10/2011 | Watanabe ............ G01N 27/128 702/23 |

OTHER PUBLICATIONS

Gudilin, D., International Search Report and Written Opinion of the International Searching Authority for PCT/US2015/031909, completed Aug. 3, 2015, dated Sep. 3, 2015 pp. 1-7.

* cited by examiner

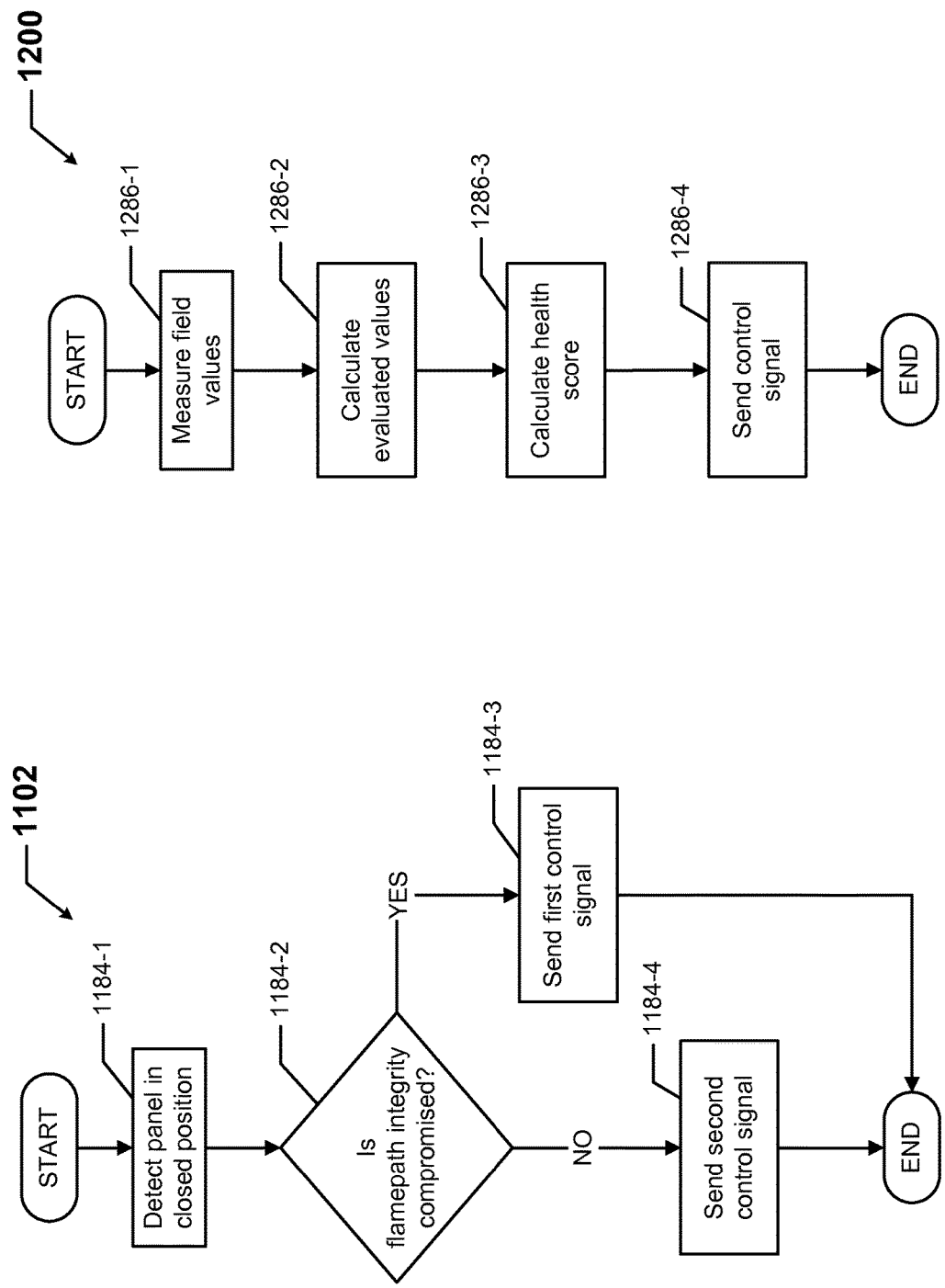

ENCLOSURE DIAGNOSTIC AND CONTROL SYSTEMS

CROSS-REFERENCE TO RELATED APPLICATIONS

This application claims priority under 35 U.S.C. § 119 to U.S. Provisional Patent Application Ser. No. 62/001,167, titled "Enclosure Diagnostic and Control Systems" and filed on May 21, 2014, the entire contents of which are hereby incorporated herein by reference.

TECHNICAL FIELD

Embodiments described herein relate generally to control systems, and more particularly to systems, methods, and devices for enclosure control systems.

BACKGROUND

Enclosures house one or more of a number of electrical and/or mechanical devices. In some cases, an enclosure is subjected to one or more adverse conditions, including but not limited to extreme temperatures, explosive and toxic gases, and high humidity. In addition, some enclosures are difficult to open (e.g., explosion-proof enclosures) and/or are located in inconvenient (e.g., remote) locations. A user can benefit from knowing when one or more devices positioned within and/or controlled from within such an enclosure fails or is showing signs of failure.

SUMMARY

In general, in one aspect, the disclosure relates to an enclosure diagnostic and control system. The system can include a controller having a storage repository, where the storage repository comprises at least one threshold value and at least one algorithm. The system can also include an enclosure communicably coupled to the controller and electrically coupled to a field device. The system can further include a number of sensors communicably coupled to the controller, where the sensors measure a number of field values of a number of parameters associated with the field device. The controller can evaluate the field values using the at least one algorithm to generate an evaluated value. The controller can output a control signal based on the evaluated value.

In another aspect, the disclosure can generally relate to a method for diagnosing a field device within a system. The method can include receiving a number of values of a number of parameters from a number of sensors, where in the parameters are associated with the field device. The method can also include evaluating the field values using at least one algorithm. The method can further include generating, based on evaluating the field values, an evaluated value. The method can also include comparing the evaluated value with a threshold value. The method can further include determining whether the evaluated value falls outside of a range of acceptable values.

These and other aspects, objects, features, and embodiments will be apparent from the following description and the appended claims.

BRIEF DESCRIPTION OF THE DRAWINGS

The drawings illustrate only example embodiments of enclosure diagnostic and control systems and are therefore not to be considered limiting of its scope, as enclosure diagnostic and control systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 11A-11C each show a flow diagram of a method for detecting an issue with a panel using an enclosure diagnostic and control system in accordance with certain example embodiments.

FIG. 12 shows a flow diagram of a method for assessing the condition of an enclosure system using an enclosure diagnostic and control system in accordance with certain example embodiments.

DETAILED DESCRIPTION OF EXAMPLE EMBODIMENTS

Figure 1:
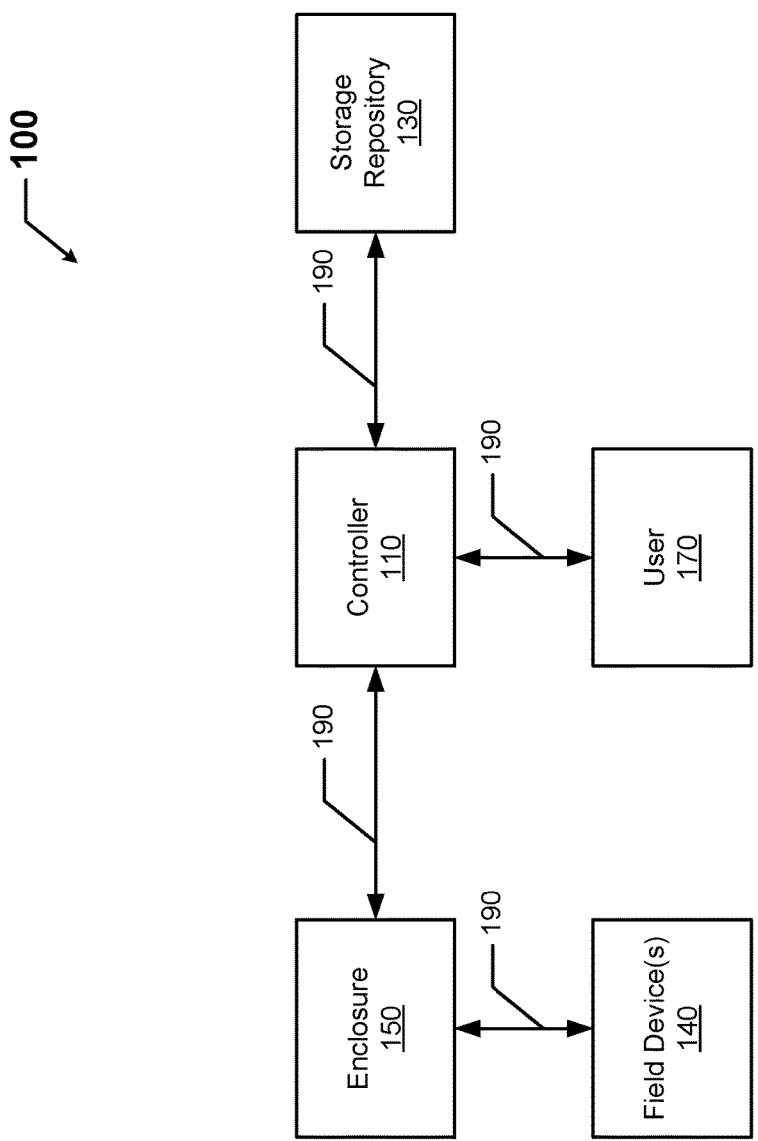
FIG. 1 shows a system diagram of an enclosure diagnostic and control system in accordance with certain example embodiments.

The example embodiments discussed herein are directed to systems, apparatuses, and methods of enclosure diagnostic and control systems. As described herein, a user can be any person that interacts with example enclosure diagnostic and control systems. Examples of a user may include, but are not limited to, a consumer, an electrician, an engineer, a mechanic, a pipe fitter, an instrumentation and control technician, a consultant, a contractor, an operator, an equipment distributor/reseller, and a manufacturer's representative.

The enclosure diagnostic and control systems (or components thereof) described herein can be physically placed in outdoor environments. In addition, or in the alternative, example enclosure diagnostic and control systems (or components thereof) can be subject to extreme heat, extreme cold, moisture, humidity, chemical exposure (related to potential combustion for chemical corrosion), high winds, dust, and other conditions that can cause wear on the enclosure or portions thereof. In certain example embodiments, the enclosure diagnostic and control systems, including any components and/or portions thereof, are made of materials that are designed to maintain a long-term useful life and to perform when required without mechanical failure.

As defined herein, an evaluated value can be a field value (a measurement made by a sensor) in raw, unaltered form. In addition, or in the alternative, an evaluated value can be the result of a field value that has somehow been processed. A field value can be processed to generate an evaluated value in one or more of a number of ways, including but not limited to applying a conversion factor, multiplying by a value (e.g., a constant), and using the field values in an algorithm.

In the foregoing figures showing example embodiments of enclosure diagnostic and control systems, one or more of the components shown may be omitted, repeated, added, and/or substituted. Accordingly, example embodiments of a enclosure diagnostic and control systems should not be considered limited to the specific arrangements of components shown in any of the figures. For example, features shown in one or more figures or described with respect to one embodiment can be applied to another embodiment associated with a different figure or description.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Example embodiments of enclosure diagnostic and control systems will be described more fully hereinafter with reference to the accompanying drawings, in which example embodiments of enclosure diagnostic and control systems are shown. Enclosure diagnostic and control systems may, however, be embodied in many different forms and should not be construed as limited to the example embodiments set forth herein. Rather, these example embodiments are provided so that this disclosure will be thorough and complete, and will fully convey the scope of enclosure diagnostic and control systems to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of enclosure diagnostic and control systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of an enclosure diagnostic and control system 100 in accordance with certain example embodiments. The system 100 of FIG. 1 can include one or more enclosures 150, one or more field devices 140, at least one controller 110, at least one database 130, and at least one user system 170. The at least one controller 110 (collectively called a controller 110 or a master controller 110) can be communicably coupled to the enclosures 150, the at least one database 130 (collectively called a storage repository 130), and the at least one user system 170 (collectively called a user 170) using a network 190. The network 190 can include wired (e.g., Class 1 electrical cables, Class 2 electrical cables, electrical connectors) and/or wireless (e.g., Wi-Fi, visible light communication, cellular networking, Bluetooth, HART, wirelessHART, ISA100) technology of sufficient capacity (e.g., bandwidth, cable size) to facilitate the transfer of power, control, and/or communication signals (e.g., data) between the various components of the system 100.

An enclosure 150 (also called an electrical enclosure 150) is any type of cabinet or housing inside of which is disposed electrical and/or electronic equipment. Such electrical and/or electronic equipment can include, but is not limited to, a control module, a hardware processor, a power module (e.g., a battery, a driver, a ballast), a variable frequency drive (VFD), a sensor module, a light source, electrical cables, and electrical conductors. An enclosure 150 can include one or more of a number of enclosure types and/or be called by one or more of a number of other names, including but not limited to a light fixture, a panel board, a VFD cabinet, a junction box, an explosion-proof enclosure, a fire-proof enclosure, a motor control center, a switchgear cubicle, a breaker cabinet, and a luminaire.

As defined herein, an enclosure 150 is located in an environment that is, at least to a substantial extent, not artificially climate controlled (also called a substantially naturally-controlled environment). Examples of such an environment can include, but are not limited to, an airplane hangar, a drilling rig (as for oil, gas, or water), a production rig (as for oil or gas), a refinery, a chemical plant, a power plant, a mining operation, a marine environment, a hazardous environment, a wastewater treatment facility, and a steel mill. An example of something that is not an environment for an enclosure described herein is an office building. Another example of something that is not an environment for an enclosure described herein is a server room as a stand-alone system. More specifically, a server room could be part of an example system. Thus, while a field device might not be located in a server room, an evaluation of the field device using example embodiments can occur in a server room.

The enclosure 150 can be required to comply with one or more of a number of standards and/or regulations. Such standards and/or regulations can be created, maintained, and enforced by one or more of a number of entities. For example, the National Electric Code (NEC), the National Electrical Manufacturers Association (NEMA), the International Electrotechnical Commission (IEC), and the Institute of Electrical and Electronics Engineers (IEEE) set standards as to electrical enclosures, wiring, and electrical connections. Enclosures 150 described herein meet (and/or allow a corresponding device to meet) such standards when required. In some (e.g., PV solar) applications, additional standards particular to that application may be met by the electrical enclosures 150 described herein.

In one or more example embodiments, the enclosure 150 is an explosion-proof enclosure. An explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure is subject to meeting certain standards and/or requirements. For example, NEMA sets standards with which the enclosure 150 must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the NEC (e.g., Class 1, Division I) and Underwriters' Laboratories, Inc. (UL) (e.g., UL 1203). For example, a Class 1 hazardous area under the NEC is an area in which flammable gases or vapors may be present in the air in sufficient quantities to be explosive. More details of the enclosure 150 are provided below with respect to FIG. 3.

A field device 140 of the system 100 can be located outside of, or within, the enclosure 150. Each field device 140 can be coupled to one or more components of the enclosure using the network 190. As defined herein, a field device 140 can be a piece of equipment (e.g., a motor, a pump, a breaker, a relay), a downstream electrical enclosure (e.g., a control panel, an explosion-proof enclosure), a subsystem, and/or any other combination of components that are part of the overall system 100.

In certain example embodiments, the controller 110 (also sometimes called a controller 110) can generate and coordinate the functionality of the system 100. For example, the controller 110 can generate and send instructions, receive information (e.g., data), perform calculations, perform evaluations, compare measured or calculated values against threshold values, generate and send notifications, control a device (e.g., a field device 140), send information (e.g., data), receive instructions, follow commands, and communicate with other controllers.

The controller 110 can also be called, for example, a computer system, a system, an application system, and a hardware system. The controller 110 can include a hardware processor-based component that executes software instructions using integrated circuits, discrete components, and/or other mechanical and/or electronic architecture. In addition, or in the alternative, the controller 110 can include one or more of a number of non-hardware-based components. An example of such a non-hardware-based components can include one or more field programmable gate arrays (FPGA). Using FPGAs and/or other similar devices known in the art allows the controller 110 to be programmable and function according to certain logic rules and thresholds without the use, or with limited use, of a hardware processor.

Communication between the enclosure 150, the user system 170, the storage repository 130, and the controller 110 using the network 190 can include the transfer (sending and/or receiving) of data. Such data can include instructions, status reports, notifications, and/or any other type of information. Further details of a hardware-based controller 110 is provided below with respect to FIG. 2.

The user system 170 can be a person, a computing device (e.g., a tablet, a cell phone, a laptop computer, a desktop computer), or any combination thereof. The user system 170 can communicate with the controller 110. In certain example embodiments, the user system 170 can also communicate with an enclosure 150 and/or the storage repository 130. The storage repository 130 can store one or more of a number of threshold values, formulas, algorithms (which can include one or more formulas), processes, and/or historical data. The threshold values stored in the storage repository 130 can be based on one or more of a number of factors, including but not limited to industry standards, reliability standards, manufacturer specifications, actual performance of a field device 140, and maintenance history of a field device 140.

Figure 2:
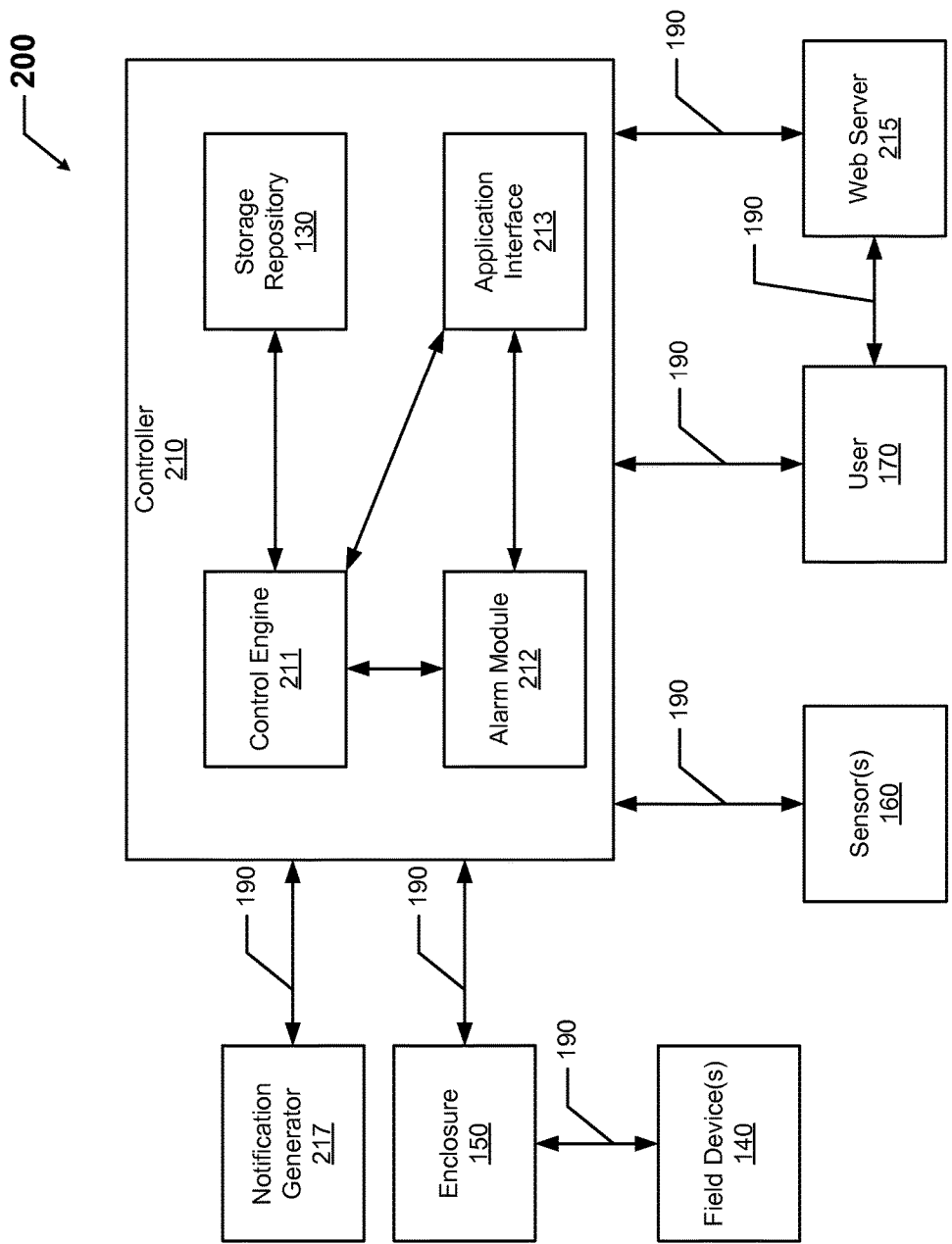
FIG. 2 shows a diagram of a controller of an enclosure diagnostic and control system in accordance with certain example embodiments.

FIG. 2 shows a diagram of a subsystem 200 that includes the controller 210 in accordance with certain example embodiments. The controller 210 can include one or more of a number of components. For example, as shown in FIG. 2, the controller 210 can include a control engine 211, an alarm module 212, an application interface 213, and the storage repository 130, which in this case is located within the controller 210 rather than remotely from the controller, as shown in FIG. 1. The controller 210 can also include one or more of a number of other components, including but not limited to memory, a hardware processor, an application interface, a security module, a timer, a communication module (for putting signals that are sent and received by the controller in a suitable format under a suitable communication protocol), and a transceiver.

The controller 210 of FIG. 2 is substantially the same as the controller 110 of FIG. 1, except as described herein. The various components of the controller 210 can each be located within or outside of a housing. A component of the controller 210 can communicate with one or more other components of the controller 210, principally driven by the control engine 211.

In addition, or in the alternative, the controller 210 can communicate with one or more other components outside of the controller 210 (e.g., an enclosure 150) using the network 190. Such other components can include, as shown in FIG. 2, a notification generator 217, a web server 215, one or more enclosures 150, one or more sensors 160, and a user system 170. The notification generator 217 can include one or more graphical user interfaces (GUIs). Such GUIs can be uniquely designed for a particular system, subsystem, field device, control panel, and/or any other component of an overall system 100. In certain example embodiments, a GUI can be activated, modified, and/or otherwise utilized based on a condition or a change of condition of a field device.

The user 170 and the controller 210 can interact, either directly or using the application interface 215, using the network 190. For example, the application interface 215 of the controller 210 receives data (e.g., information, communications, instructions) from and sends data (e.g., information, communications, instructions) to the user 150. The user 150 and/or the controller 210 can include an interface to facilitate communication between them. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The user 150 and the controller 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 210. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, and a personal digital assistant (PDA). Such a system can correspond to a computer system as described below with regard to FIG. 14.

Further, as discussed above, such a system can have corresponding software (e.g., user software, sensor software, controller software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 200.

The controller 210 can receive, directly or indirectly, a number of field values measured by one or more sensors 160 using the network 190. The one or more sensors 160 can be any type of sensing device that measure one or more field values (also called parameters). Examples of types of sensors 160 can include, but are not limited to, a passive infrared sensor, a photocell, a pressure sensor, an air flow monitor, a gas detector, an ammeter, a voltmeter, a camera, a humidity measurement device, a capacitive sensor for water, and a resistance temperature detector. A field value that can be measured by a sensor 160 can include, but is not limited to, motion, an amount of ambient light, occupancy of a space, and an ambient temperature. In some cases, the field values measured by a sensor 160 can be used, directly or indirectly, to operate one or more field devices 140. Each sensor 160 can use one or more of a number of communication protocols that is compatible with at least one communication protocol used by the controller 210.

These field values can be associated with a field device 140 (e.g., a motor, a relay, a pump, a sensor, a control panel). In certain example embodiments, the control engine 211 of the controller 210 evaluates the field values using one or more algorithms (or other data stored in the storage repository 130) to generate an evaluated value. The controller 210 can compare the evaluated value with one or more threshold values stored in the storage repository 130. If the control engine 211 of the controller 210 determines that evaluated value exceeds, falls below, or otherwise falls outside of a range of acceptable values bounded by a threshold value, then the control engine 211 of the controller 210 can perform one or more of a number of actions. Examples of such actions can include, but are not limited to, engaging an actuator (described below) to change the state of the field device 140, notifying a user, recommending replacing a field device 140, and developing a maintenance schedule for the field device 140.

In certain example embodiments, the alarm module 212 of the controller 210 generates one or more notifications based on an evaluation performed by the control engine 211. A notification generated by the alarm module 212 can serve one or more of a number of purposes. Examples of a purpose of a notification can include, but are not limited to, an assessment of a field device 140, a report of a warranty with respect to a field device 140, a report of the failure of a field device 140, a report of operating conditions of a field device 140, a recommendation of preventative maintenance for a field device 140, a disclosure of product information of a field device 140 (such as to support a maintenance worker tasked with repairing the field device 140), an alarm of an emergency condition caused by a field device 140, and a status of the operating condition of a field device 140.

The notification generator 217 can receive and communicate the notification generated by the alarm module. The notification generator 217 can generate an audio output (e.g., an alarm, a siren), a visual output (e.g., a light, a text message, wording on a display, an email), and/or any other suitable output that can be received by a user 170.

Figure 3:
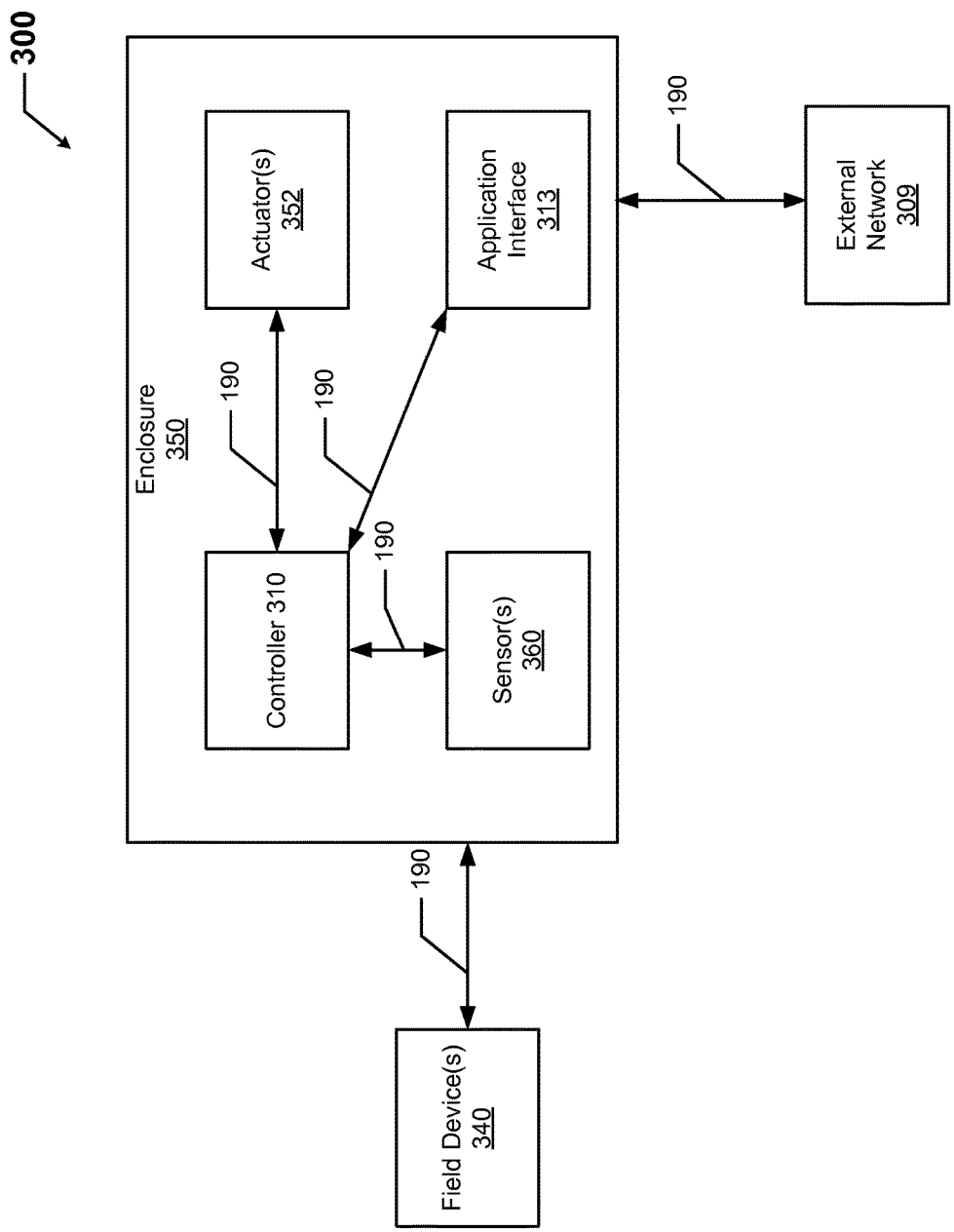
FIG. 3 shows a diagram of an enclosure of an enclosure diagnostic and control system in accordance with certain example embodiments.

FIG. 3 shows a diagram of a subsystem 300 that includes an enclosure 350 in accordance with certain example embodiments. The enclosure 350 of FIG. 3 can be substantially the same as the enclosure 150 of FIGS. 1 and 2, except as described below. Referring to FIGS. 1-3, the enclosure 350 can include one or more of a number of components. For example, as shown in FIG. 3, the enclosure 350 can include one or more sensors 360, one or more actuators 352, an application interface 313, and a controller 310. In this case, the sensors 360, the application interface 313, and the controller 310 are substantially the same as the corresponding components described above, except that they are all disposed within the enclosure 350 in this example and that the application interface 313 is a separate component from the controller 310.

The enclosure 350 and/or one or more of its components can have a known physical location within the system 300 (e.g., a refinery, a pipeline, a power plant). Thus, if the controller 310, sensors 360, and/or other component of the system 300 detects a condition (e.g., a problem, an opportunity to improve efficiency) based on field values measured by the sensors 360, the controller 310 can determine and communicate a physical location of the condition based, for example, on the location of the sensors 360, the field values being measured, and the manufacturer's information regarding the sensors 360.

A sensor 360 can be one or more of a number of devices (including a field device 340) that can measure a value of a parameter (a field value) and/or detect a condition associated with and/or that can affect a field device 340. Examples of a sensor 360 can include, but are not limited to, a thermometer, a humidity measurement device, a corrosion detector, a radio frequency identification device, a gas sensor, an air analyzer, a pressure sensor, a photocell, a motion sensor, a water level sensor, a proximity sensor, and a flow sensor. The field values measured by a sensor 360 can correspond to (e.g., be compared with) a threshold value stored in the storage repository 130.

In certain example embodiments, there are multiple sensors 360 communicably coupled to the controller 310 of the enclosure 350 using the network 190. The multiple sensors 360 can measure the value of multiple parameters (field values). In other words, the predictive capability of the system 300 for purposes of preventive maintenance, measurement of useful life of a component (e.g., a field device 340) of the system 300, and/or other such purposes can rely on collecting values of multiple parameters using multiple sensors 360 over time.

An actuator 352 can be a field device 340 and/or can operate a field device 340 and/or stop a field device 340 from operating. In other words, an actuator 352 can change the state of one or more of a number of field devices 340. Examples of an actuator can include, but are not limited to, a dimmer, a thermostat, a breaker, a motor starter, a switch, a relay coil, and a valve. In certain example embodiments, the controller 310 controls (or at least communicates with) the sensors 360, the actuators 352, and the application interface 313. The sensors 360, the actuators 352, the application interface 313, and the controller 310 can each be located within or outside of a housing of the enclosure 350. The application interface 313 can be communicably coupled to the controller 310 and/or an external network 309 (e.g., a user) using the network 190.

Figure 4:
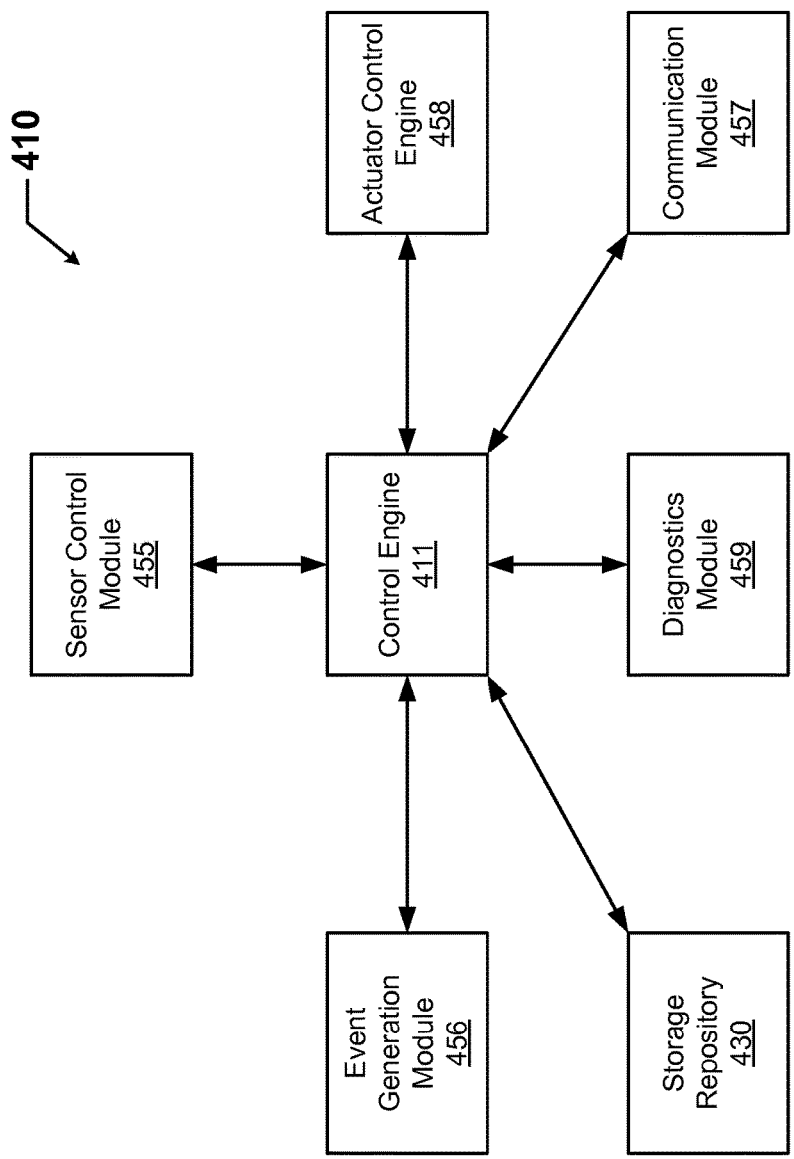
FIG. 4 shows a diagram of a controller of an enclosure diagnostic and control system in accordance with certain example embodiments.

FIG. 4 shows a diagram of a controller 410 of an enclosure diagnostic and control system in accordance with certain example embodiments. The controller 410 of FIG. 4 can be substantially the same as a controller described above, except as described below. The controller 410 can be any device or part of a device of a system that controls at least one other device (including a field device) or part of a component of the system.

As described above, the controller 410 can include one or more of a number of components. For example, as shown in FIG. 4, the controller 410 can include a sensor control module 455, an event generation module 456, a storage repository 430, a control engine 411, a diagnostics module 459, a communications module 457, and an actuator control module 458. Any of the components of the controller 410 shown in FIG. 4 can be part of the control engine 411 rather than separate components. The storage repository 430 and the control engine 411 can be substantially the same as the storage repositories and the control engines described above, except as described below.

Referring to FIGS. 1-4, the various components of the controller 410 can each be located within or outside of a common housing. The control engine 411 of the controller 410 can communicate with one or more other components of the controller 410. In addition, or in the alternative, a component (e.g., the control engine 411) of the controller 410 can communicate with one or more other components (e.g., actuator 352, sensor 360) of a system outside of the controller 410 using the network 190 and/or some other communication infrastructure. In performing an evaluation, the controller 410 can use the direct values (also called field values) of measurements of parameters taken by one or more sensors (e.g., sensors 360). In addition, or in the alternative, the controller 410 can perform an evaluation using calculated values based on the field values measured by the sensors 360.

The sensor control module 455 can communicate with the control engine 411 and one or more sensors (e.g., sensors 160) in the system. The sensor control module 455 can send communication signals (e.g., instructions) to the sensors 160 to operate according to the instructions received from the control engine 411. The sensor control module 455 can also receive one or more field values measured by the sensors 160 and pass such field values, either in raw or processed form, along to the control engine 411.

The diagnostics module 459 can communicate with the control engine 411. The diagnostics module 459 can interpret various data (e.g., field values, user instructions, nameplate data of a field device 140, maintenance and operational history of a field device 140, algorithms) to determine the status or condition of a field device. Based on this evaluation of the field device 140 by the diagnostics module 459, the diagnostics module 459 can recommend to the control engine 411 that certain sensors 160 take certain measurements of field values at certain times. In addition, or in the alternative, the diagnostics module 459 can recommend to the control engine 411 that event generation module 456, the alarm module 212, and/or some other component of the controller 410 generate an output (e.g., a control signal) to communicate the evaluation of the field device 140 to a user 170.

The event generation module 456 can communicate with the control engine 411. Specifically, the event generation module 456 can combine field values and/or other information to determine a condition that exists within the system. For example, the event generation module 456 can determine that a loose wiring connection has been detected based on a "hot spot" (a type of field value) read by an IR sensor (a type of sensor 160), combined with low current flowing through an electrical conductor at that location. As another example, the event generation module 456 can determine that a door to an enclosure (e.g., enclosure 150) is open based on an open switch (a type of field value) read by an enclosure door sensor (a type of sensor 160), combined with a closed switch (a type of field value) read by the enclosure door sensor one minute before.

The actuator control engine 458 can also communicate with the control engine 411. The actuator control engine 458 can control one or more actuators (e.g., actuator 352) based on evaluations of a field device 140 by the diagnostics module 459, an evaluation of a condition in the system by the event generation module 456, and/or an output of some other component of the controller 410.

In certain example embodiments, the communication module 457 of the controller 410 determines and implements the communication protocol that is used when the control engine 411 communicates with (e.g., sends signals to, receives signals from) the user 170, an enclosure (e.g., enclosure 150), and/or one or more of the sensors (e.g., sensor 160). In some cases, the communication module 457 uses information (e.g., manufacturer's information about a sensor, the specifications of the system used by the user) received from the control engine 411 to determine which communication protocol is within the capability of the recipient of a communication sent by the control engine 411. In addition, the communication module 457 can interpret the communication protocol of a communication received by the controller 411 from another component or device of the system so that the control engine 411 can interpret the communication.

The communication module 457 can send data directly to and/or retrieve data directly from the storage repository 430. Alternatively, the control engine 411 can facilitate the transfer of data between the communication module 457 and the storage repository 430. The communication module 457 can also provide encryption to data that is sent by the controller 410 and decryption to data that is received by the controller 410. The communication module 457 can also provide one or more of a number of other services with respect to data sent from and received by the controller 410. Such services can include, but are not limited to, data packet routing information and procedures to follow in the event of data interruption.

FIGS. 5-13 show various examples of methods performed using an example enclosure diagnostic and control system (e.g., enclosure diagnostic and control system 100). While the various steps in these flowcharts are presented sequentially, one of ordinary skill will appreciate that some or all of the steps may be executed in different orders, may be combined or omitted, and some or all of the steps may be executed in parallel. Further, in one or more of the example embodiments, one or more of the steps shown in these example methods may be omitted, repeated, and/or performed in a different order.

In addition, a person of ordinary skill in the art will appreciate that additional steps not shown in FIGS. 5-13 may be included in performing these methods. Accordingly, the specific arrangement of steps should not be construed as limiting the scope. Further, a particular computing device, such as the computing device discussed below with respect to FIG. 14, can be used to perform one or more of the steps for the methods shown in FIGS. 5-13 in certain example embodiments. The methods discussed in FIGS. 5-13 are not exclusive, meaning that the evaluation of other field devices based other field values using other algorithms and/or sensors is possible using example embodiments.

Referring to FIGS. 1-13, FIG. 5 shows a flow diagram of a method 500 for detecting condensation within an enclosure (e.g., enclosure 150) using an enclosure diagnostic and control system (e.g., enclosure diagnostic and control system 100) in accordance with certain example embodiments. FIG. 6 shows a flow diagram of a method 600 for detecting a loose wiring connection using an enclosure diagnostic and control system in accordance with certain example embodiments. FIG. 7 shows a flow diagram of a method 700 for monitoring a circuit breaker using an enclosure diagnostic and control system in accordance with certain example embodiments.

Figure 8:
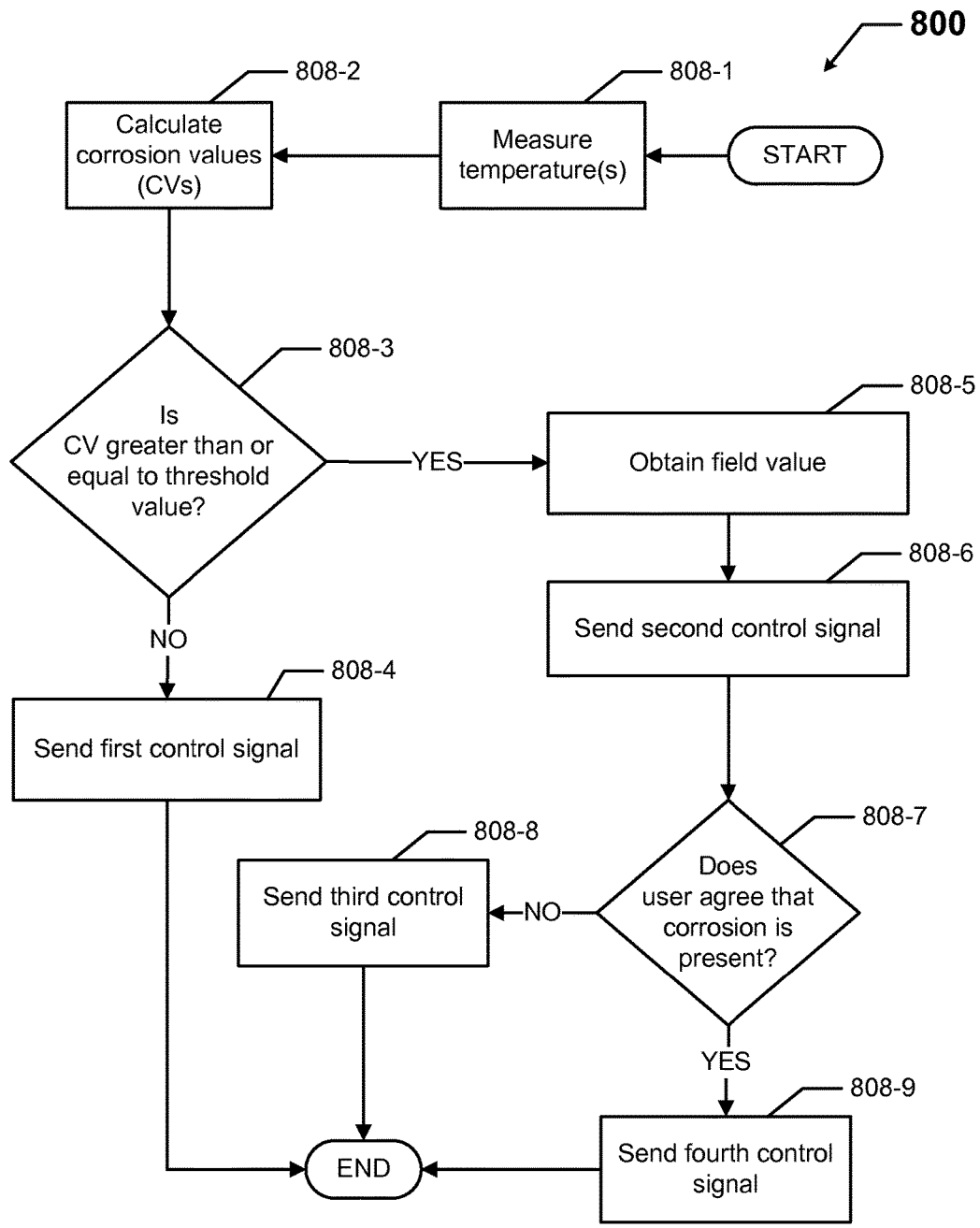
FIG. 8 shows a flow diagram of a method for detecting corrosion using an enclosure diagnostic and control system in accordance with certain example embodiments.
Figure 9:
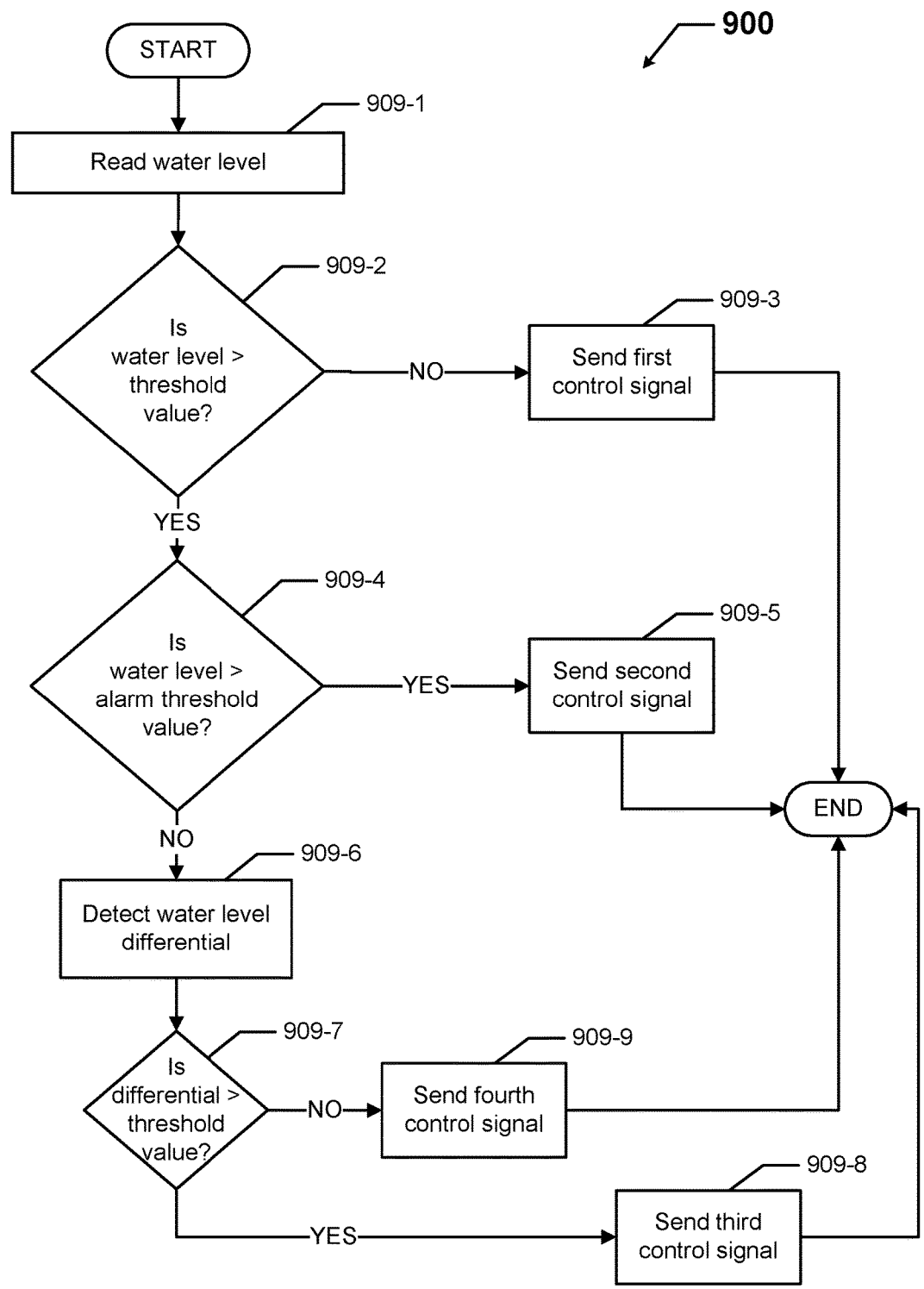
FIG. 9 shows a flow diagram of a method for monitoring a water level using an enclosure diagnostic and control system in accordance with certain example embodiments.
Figure 10:
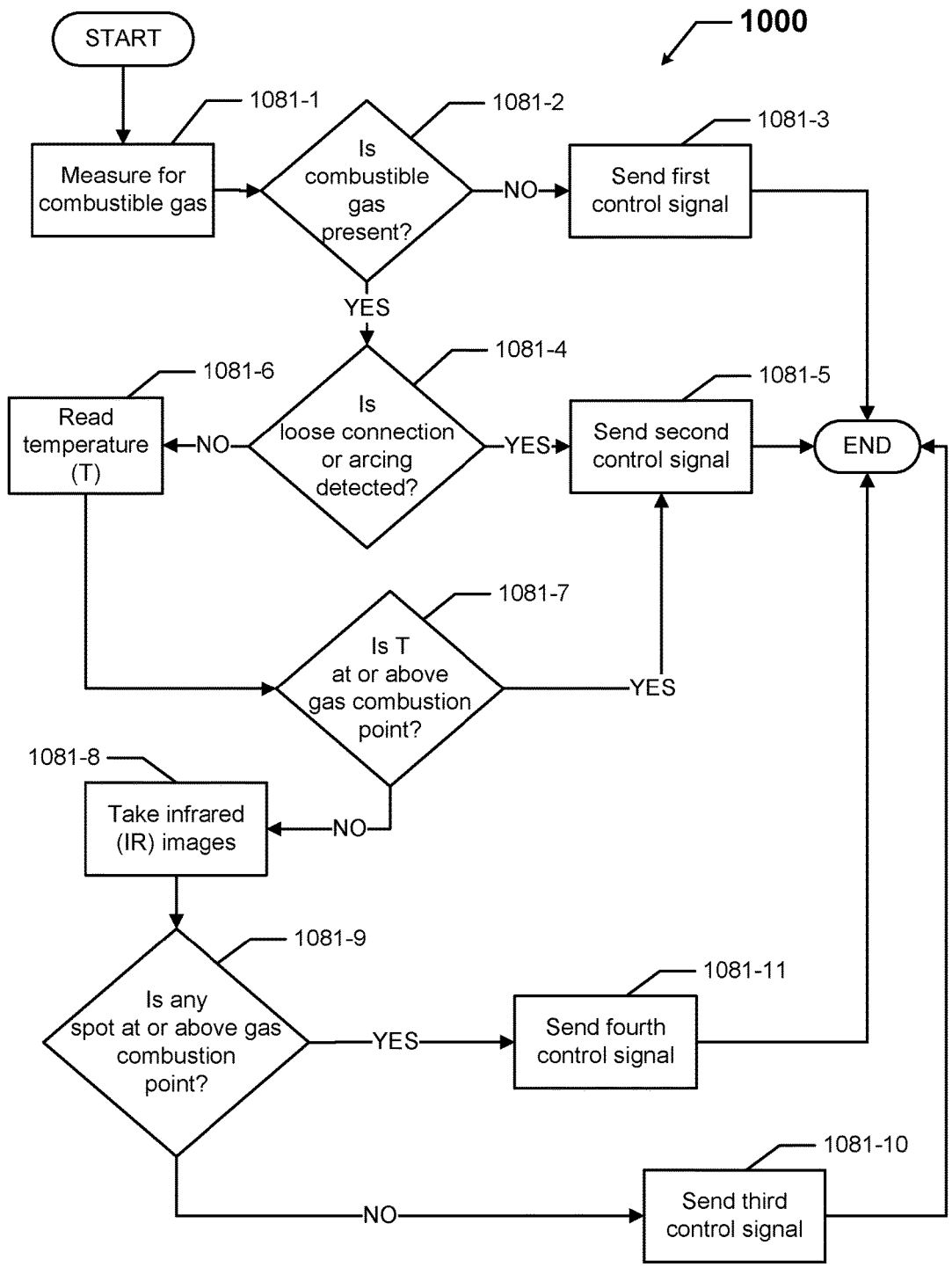
FIG. 10 shows a flow diagram of a method for detecting combustion using an enclosure diagnostic and control system in accordance with certain example embodiments.
Figure 11B:
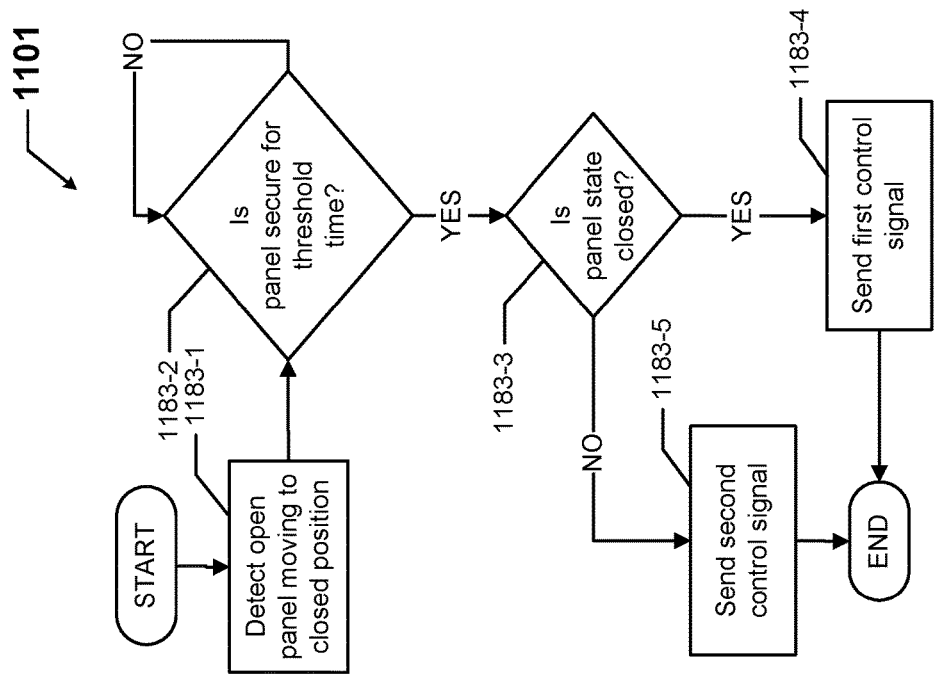
Figure 11A:
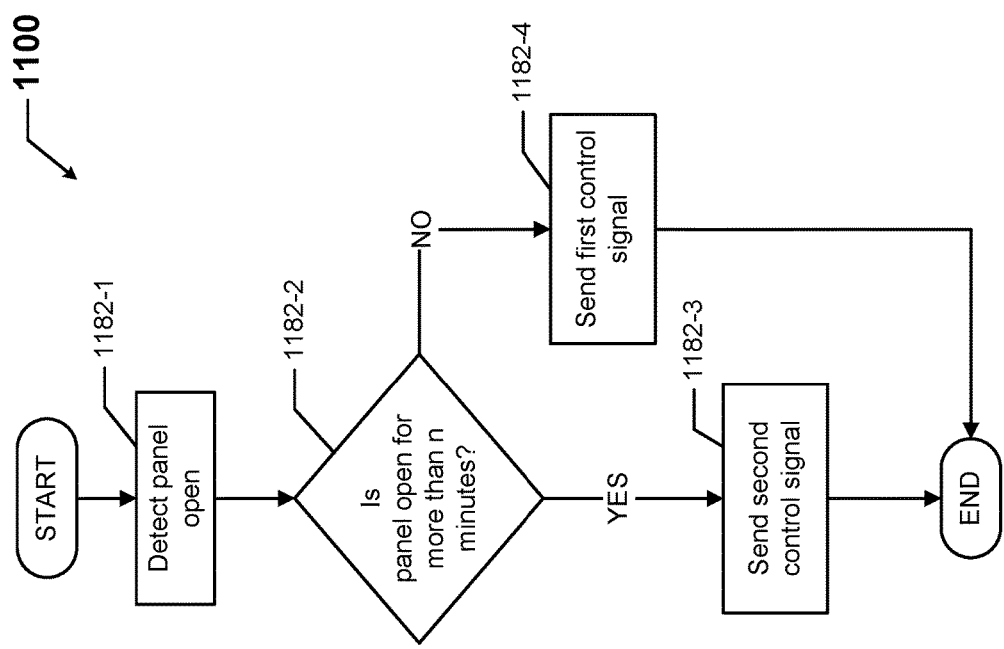
Figure 13:
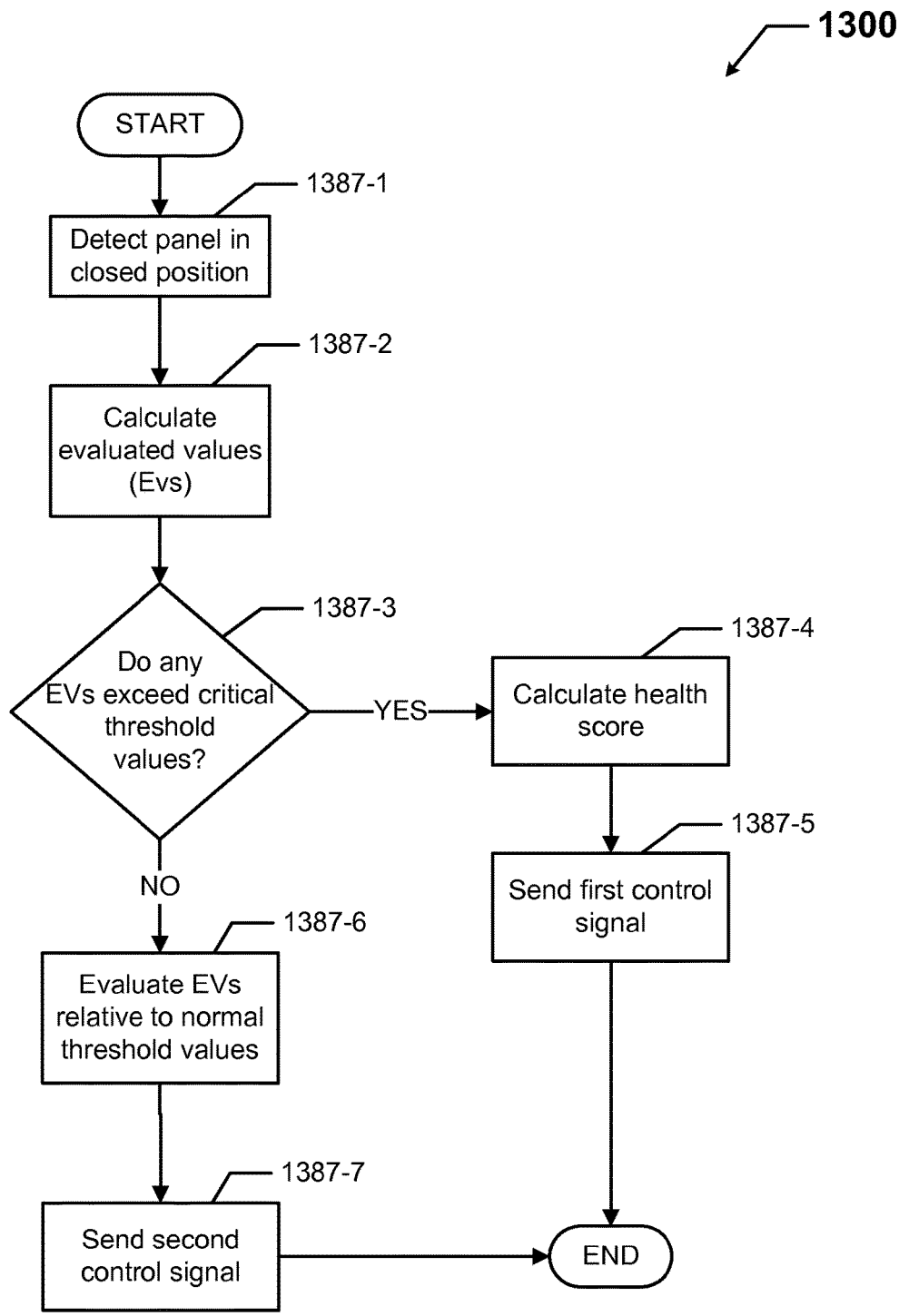
FIG. 13 shows a flow diagram of a method for assessing the condition of an overall system in accordance with certain example embodiments.

FIG. 8 shows a flow diagram of a method 800 for detecting corrosion using an enclosure diagnostic and control system in accordance with certain example embodiments. FIG. 9 shows a flow diagram of a method 900 for monitoring a water level in an enclosure (e.g., enclosure 350) using an enclosure diagnostic and control system in accordance with certain example embodiments. FIG. 10 shows a flow diagram of a method 1000 for detecting combustion using an enclosure diagnostic and control system in accordance with certain example embodiments. FIGS. 11A-11C each show a flow diagram of a method (method 1100, method 1101, and method 1102, respectively) for detecting an issue with a panel using an enclosure diagnostic and control system in accordance with certain example embodiments. FIG. 12 shows a flow diagram of a method 1200 for assessing the condition of an enclosure system using an enclosure diagnostic and control system in accordance with certain example embodiments. FIG. 13 shows a flow diagram of a method 1300 for assessing the condition of an overall system in accordance with certain example embodiments.

Figure 5:
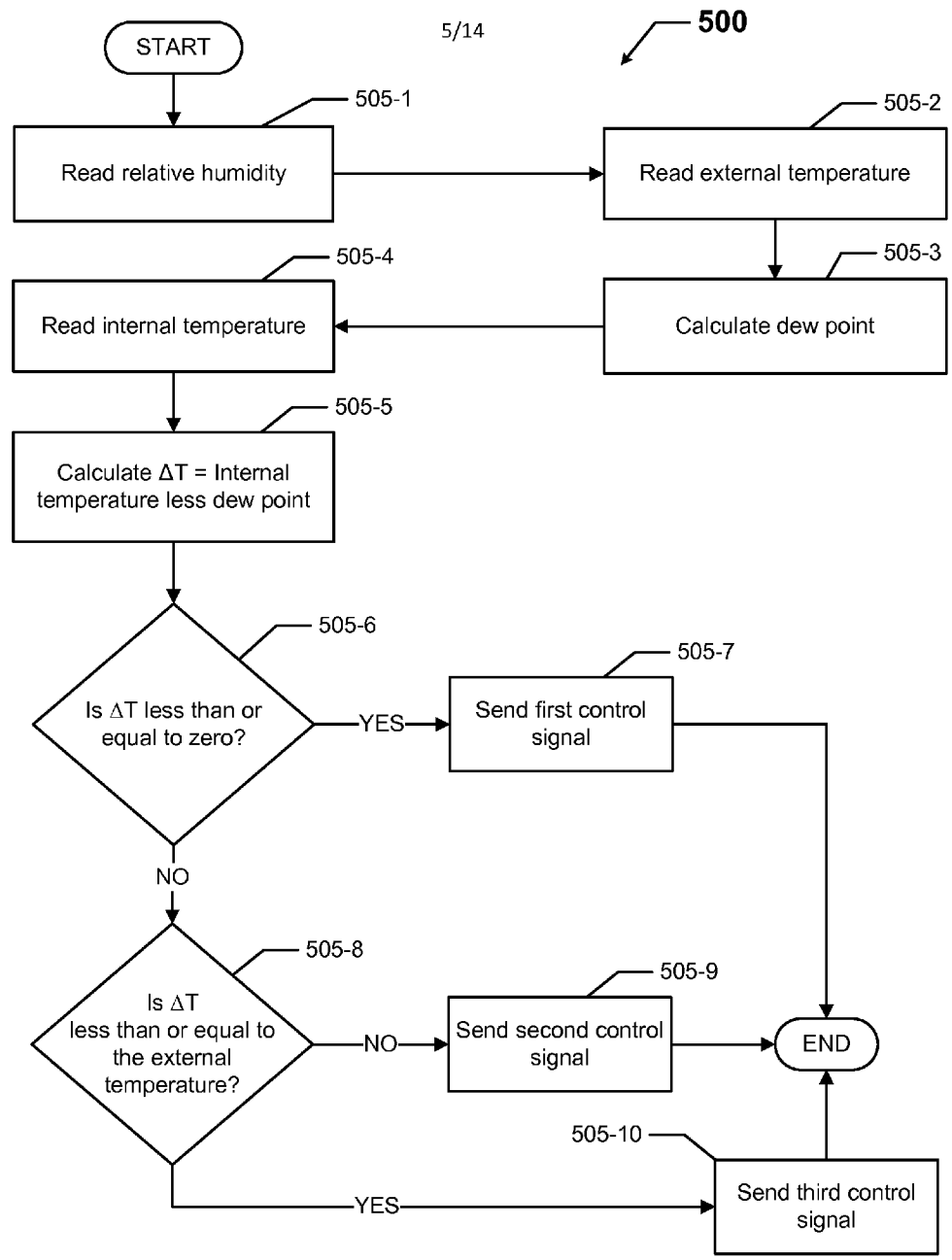
FIG. 5 shows a flow diagram of a method for detecting condensation using an enclosure diagnostic and control system in accordance with certain example embodiments.
Figure 6:
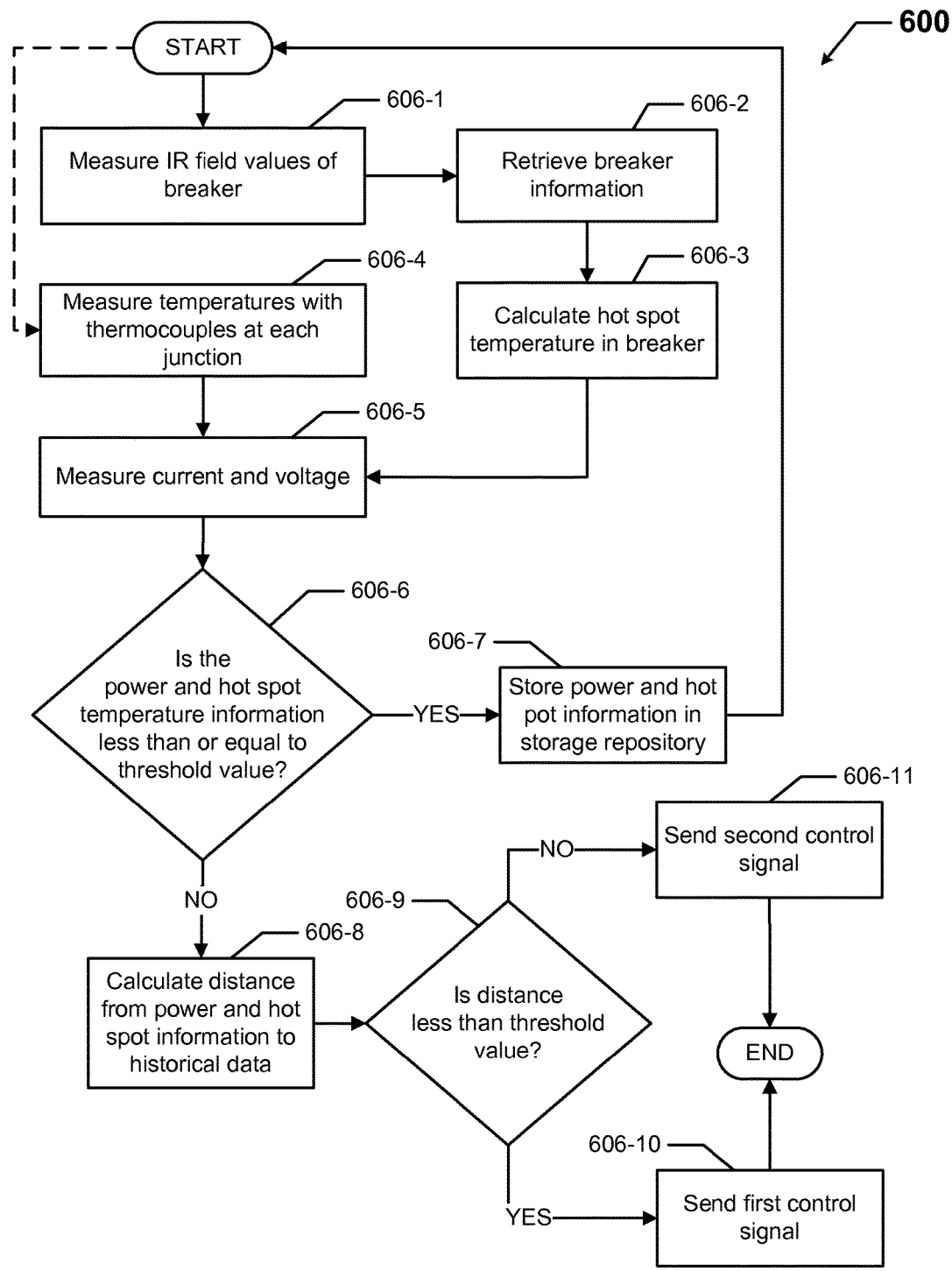
FIG. 6 shows a flow diagram of a method for detecting a loose wiring connection using an enclosure diagnostic and control system in accordance with certain example embodiments.
Figure 7:
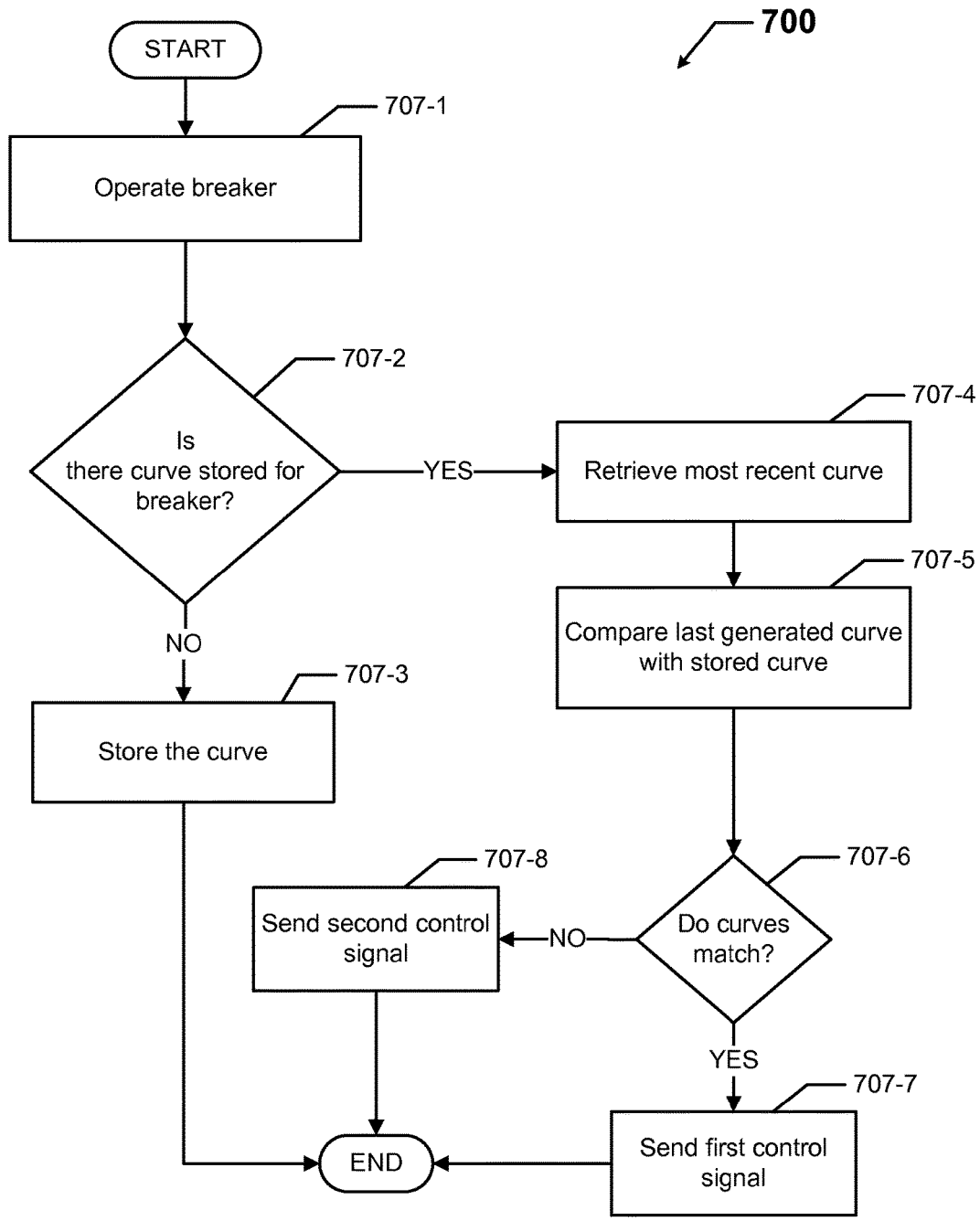
FIG. 7 shows a flow diagram of a method for monitoring a circuit breaker using an enclosure diagnostic and control system in accordance with certain example embodiments.

In these examples, the enclosure of FIGS. 5, 9, and 11, the wiring connection of FIG. 6, the circuit breaker of FIG. 7, the equipment having corrosion in FIG. 8, the equipment subject to combustion in FIG. 10, and the enclosure system of FIGS. 11-13 can each be considered to be, or considered to be part of, a field device (e.g., field device 140). Each of the methods shown in FIGS. 5-13 are merely examples of diagnostic and/or control functions that can be performed by using an example system described herein. In other words, example enclosure diagnostic and control systems can perform other functions in addition to and/or aside from those shown in FIGS. 5-13.

In FIG. 5, the method 500 begins at the START step and proceeds to step 505-1, where a relative humidity inside the enclosure is read or measured. In such a case, the relative humidity is measured by a sensor (e.g., sensor 160). The relative humidity, when measured, is a field value. The relative humidity can also be measured outside the enclosure by the same or a different sensor. The relative humidity value can be sent from the sensor to the controller (e.g. controller 410). The controller can determine which sensors are reading the relative humidities and when those relative humidities are read.

In step 505-2, the temperature external to the enclosure is read or measured. In such a case, the temperature is measured by a sensor, which can be the same or a different sensor than the sensor of step 505-1. The temperature, when measured, is a field value. The temperature value can be sent from the sensor to the controller. The controller can determine which sensors are reading the temperature and when that temperature is read.

In step 505-3, the dew point (also called a dew point temperature) within the enclosure is calculated. The dew point can be calculated by the controller (e.g. controller 410). The dew point can be calculated using the relative humidity of step 505-1, the temperature of step 505-2, and at least one algorithm stored in the storage repository (e.g., storage repository 430) of the controller. In step 505-4, the temperature inside the enclosure is read or measured. In such a case, the temperature is measured by a sensor (e.g., sensor 160). The temperature, when measured, is a field value. The temperature value can be sent from the sensor to the controller (e.g. controller 410).

In step 505-5, a temperature difference between the temperature within the enclosure (from step 505-4) and the dew point temperature within the enclosure (from step 505-4) is calculated. The temperature difference can be calculated by the controller. In step 505-6, a determination is made as to whether the temperature difference calculated in step 505-5 is less than or equal to zero. In such a case, zero is a threshold value. In alternative embodiments, the threshold value can be some non-zero number. Comparing the temperature difference to the threshold value can be done by the controller. If the temperature difference is less than or equal to the threshold value, then the process proceeds to step 505-7. If the temperature difference is greater than the threshold value, then the process proceeds to step 505-8.

In step 505-7, a control signal is generated and sent. The control signal can be generated and sent by the controller. The control signal can be a notification, evaluation, and/or instruction to an actuator and/or other component of the system that, in this case, condensation is accumulating within the enclosure above an acceptable level. For example, the control signal can be a notification to a user (e.g., user 170) that the enclosure should be opened and the condensation removed. As another example, the control signal can activate a fan (or other air moving device), moisture control device, or other control device that can control moisture within the enclosure to begin operating to remove the condensation within the enclosure.

In certain example embodiments, the controller can track the amount of time that the condensation exists within the enclosure without being resolved. As a result, over an amount of time determined by the controller, the control signal can also be associated with other conditions that can develop as a result of prolonged exposure to condensation with the enclosure. For example, the control signal can include a recommendation to a user to inspect connections points within the enclosure for signs of corrosion.

In step 505-8, a determination is made as to whether the temperature difference calculated in step 505-5 is less than or equal to a temperature of likely condensation. In such a case, the temperature of likely condensation is a threshold value and is determined by the controller. As described herein, threshold values can be changed (e.g., by the controller, by a user) over time. For example, by analyzing historical data and associated trends, a threshold value can be changed by the controller to more accurately diagnose conditions and avoid false failures. Comparing the temperature difference to the temperature of likely condensation can be done by the controller. If the temperature difference is less than or equal to the temperature of likely condensation, then the process proceeds to step 505-10. If the temperature difference is greater than the temperature of likely condensation, then the process proceeds to step 505-9.

In step 505-9, a control signal is generated and sent. The control signal of step 505-9 can be the same as (e.g., in terms of type of control signal, in terms of what component of the system receives the control signal, in terms of the content of the control signal), or different than, the control signal of step 505-7. The control signal can be generated and sent by the controller. The control signal can be a notification, evaluation, and/or instruction to an actuator and/or other component of the system that, in this case, condensation accumulating within the enclosure is a possibility.

In step 505-10, a control signal is generated and sent. The control signal of step 505-10 can be the same as (e.g., in terms of type of control signal, in terms of what component of the system receives the control signal, in terms of the content of the control signal), or different than, the control signal of step 505-7 and/or the control signal of step 505-9. The control signal can be generated and sent by the controller. The control signal can be a notification, evaluation, and/or instruction to an actuator and/or other component of the system that, in this case, the accumulation of condensation within the enclosure is unlikely. When step 505-7, step 505-9, or step 505-10 are complete, the process proceeds to the END step.

In FIG. 6, the method 600 begins at the START step and proceeds to step 606-1, where infrared measurements are made of one or more circuit breakers. In such a case, the infrared measurements are taken by a sensor (e.g., sensor 160). The infrared measurements are field values. The circuit breaker is a field device (e.g., field device 140). The infrared measurements can be sent from the sensor to the controller (e.g. controller 410). The controller can determine which sensors are making the infrared measurements and when those infrared measurements are read. Alternatively, the controller can receive the infrared measurements from a user, along with information (e.g., GPS data, catalog number of the field device relative to an inventory listing locations of field devices, optical recognition of the location of the field device using a camera) to associate the infrared measurements with a particular breaker.

In step 606-2, information about the breaker is retrieved. The information about the circuit breaker can be retrieved by the controller from the storage repository (e.g., storage repository 430). The information about the circuit breaker can be about the breaker itself and/or the equipment (e.g., switchgear cabinet, buswork) associated with the breaker when the breaker is closed and in operation.

In step 606-3, a hot spot temperature of the breaker is calculated. The hot spot temperature (as well as other associated information, such as the location of each hot spot temperature) can be calculated by the controller using one or more algorithms stored in the storage repository. In addition, or in the alternative, as in optional step 606-4, the hot spot temperature can be determined by other means. For example, temperature readings (field values) taken from thermocouples (sensors) in the switchgear cabinet can be collected and analyzed by the controller to determine the hot spot temperatures and associated information.

In step 606-5, the current and voltage (i.e., power) for the associated circuit is measured. In such a case, the current and voltage are measured by one or more sensors (e.g., sensor 160). The current and voltage measurements are field values. The wiring through which the power flows is a field device (e.g., field device 140). The current and voltage measurements can be sent from the sensor to the controller (e.g. controller 410). In certain example embodiments, the hot spot temperature information is correlated with the current and voltage measurements by the controller using one or more algorithms.

In step 606-6, a determination is made as to whether the power (current and voltage) and hot spot temperature information is less than one or more threshold values. The threshold values can be stored in the storage repository. The determination can be made by the controller. If the power and hot spot temperature information is less than the threshold values, then the process proceeds to step 606-7. If the power and hot spot temperature information is greater than or equal to the threshold values, then the process proceeds to step 606-8.

In step 606-7, the power and hot spot temperature information is stored in the storage repository, and the process reverts to step 606-1 at some later time. In step 606-8, one or more algorithms are used to determine the distance from the power and hot spot temperature information to the historical power and hot spot temperature information stored in the storage repository. The algorithms are selected and run by the controller. Similarly, the historical curves are selected by the controller.

In step 606-9, a determination is made as to whether the distance calculated in step 606-8 less than some threshold value. The determination is made by the controller, and the controller selects the threshold value from the storage repository. If the distance is less than the threshold value, then the process proceeds to step 606-10. If the distance is greater than or equal to the threshold value, then the process proceeds to step 606-11.

In step 606-10, a control signal is generated and sent. The control signal can be generated and sent by the controller. The control signal can be a notification, evaluation, and/or instruction to an actuator and/or other component of the system that, in this case, no loose electrical or mechanical connection was detected, that the breaker is not overloaded, that there is no phase-to-phase short, and/or some other suitable evaluation. For example, the control signal can be a notification to a user (e.g., user 170) that the connections within the breaker cabinet are sound. The controller can also store the distance and associated data in the storage repository. When step 606-10 is complete, the process proceeds to the END step.

In step 606-11, a control signal is generated and sent. The control signal of step 606-11 can be the same as (e.g., in terms of type of control signal, in terms of what component of the system receives the control signal, in terms of the content of the control signal), or different than, the control signal of step 606-10. The control signal can be generated and sent by the controller. The control signal can be a notification, evaluation, and/or instruction to an actuator and/or other component of the system that, in this case, a loose connection has been detected in the breaker cabinet.

For example, the control signal can be a notification to a user that there is a loose connection within the breaker cabinet. The control signal may also include the general or precise location of the loose connection. As another example, the control signal can activate a fan within the breaker cabinet and direct the fan toward the loose connection to help cool the hot spot until the connection is tightened. The controller can also store the distance and associated data in the storage repository. When step 606-11 is complete, the process proceeds to the END step.

In FIG. 7, the method 700 begins at the START step and proceeds to step 707-1, where a circuit breaker is operated (e.g., opened, closed). In such a case, a curve of the breaker is captured when the breaker operates. The curve can capture, for example, current over time (also called a time-current curve) during a breaker operation. Measurements associated with the curve are field values that are captured by at least one sensor (e.g., sensor 160). The circuit breaker is a field device (e.g., field device 140). The curve measurements can be sent from the sensor to the controller (e.g. controller 410). The controller can determine when to operate the breaker. In other cases, the controller can automatically direct the sensors to measure the curve when the state of a switch for the breaker is changed.

In step 707-2, a determination is made as to whether a previous curve for the breaker is stored. The previous curve can be stored in the storage repository, and the determination can be made by the controller. If a previous curve for the breaker is stored, then the process proceeds to step 707-4. If a previous curve for the breaker is not stored, then the process proceeds to step 707-3. In step 707-3, the curve is stored, after which the process can proceed to the END step. The curve can be stored in the storage repository by the controller. In certain alternative embodiments, the controller can also use the stored curves of other breakers with similar characteristics and perform an analysis substantially similar to steps 707-4 through 707-8.

In step 707-4, one or more of the stored curves is retrieved. The stored curves can be retrieved by the controller from the storage repository. The number of stored curves that are retrieved can be determined by the controller based on one or more parameters and/or logic rules (e.g., age of a curve, time between curves). In step 707-5, the curve (captured in step 707-1) is compared to the stored curves that were retrieved in step 707-4. The comparison can be performed by the controller.

In step 707-6, a determination is made as to whether the curves compared in step 707-5 match. The determination is made by the controller. The test as to whether two curves match can be based on one or more algorithms stored in the storage repository and retrieved by the controller. For example, two curves can match if they are never more than a 15% difference between them at any given time along the curves. The controller can also store the most recent curve measured during the breaker operation of step 707-1. If the curves match, then the process proceeds to step 707-7. If the curves do not match, then the process proceeds to step 707-8.

In step 707-7, a control signal is generated and sent. The control signal can be generated and sent by the controller. The control signal can be a notification, evaluation, and/or instruction to an actuator and/or other component of the system that, in this case, that the breaker operation of step 707-1 was normal. For example, the control signal can be a notification to a user (e.g., user 170) that the breaker is operating normally. In some cases, the control signal can be an update to one or more algorithms stored in the storage repository based on the measurements of the curve. When step 707-7 is complete, the process proceeds to the END step.

In step 707-8, a control signal is generated and sent. The control signal of step 707-8 can be the same as (e.g., in terms of type of control signal, in terms of what component of the system receives the control signal, in terms of the content of the control signal), or different than, the control signal of step 707-7. The control signal can be generated and sent by the controller. The control signal can be a notification, evaluation, and/or instruction to an actuator and/or other component of the system that, in this case, the breaker may be degrading. For example, the control signal can be a notification to a user that the breaker needs maintenance or replacement, based on the mismatch of the curves. When step 707-8 is complete, the process proceeds to the END step. In certain example embodiments, one or more intermediary field devices (e.g., a shunt trip device) can be controlled by the controller to add control and flexibility during an unsafe condition.

In FIG. 8, the method 800 begins at the START step and proceeds to step 808-1, where temperatures are measured. The temperatures are field values that are measured by at least one sensor (e.g., a thermostat, a thermometer). The equipment in or near which the temperatures are measured are each a field device (e.g., field device 140). The temperatures can be sent from the sensor to the controller (e.g. controller 410), and the controller can determine which sensors are reading the temperatures and when those temperatures are read. Examples of temperatures that are read can include, but are not limited to, a temperature where there is an elevated water level, a temperature in an area where there is high humidity, a temperature where there is a high level of condensation, and a temperature where there is a corrosive gas present, In step 808-2, one or more corrosion values (CVs) are calculated. The CVs can be calculated by the controller. The controller can calculate the CVs using data about the field devices, one or more algorithms, and/or any other suitable data, all of which can be stored in the storage repository. For example, as part of an algorithm, a constant or algorithm can be periodically updated based on data collected over time. In this example, a constant or algorithm for the evaluation of corrosive activity in an enclosure can be updated on a daily basis based on daily information captured and the trend of data over time. The constant or algorithm can be used in conjunction with the temperatures measured in step 808-1 to determine the CVs for the present time period.

In step 808-3, a determination is made as to whether a CV exceeds a threshold value. The determination can be made by the controller. The threshold value can be selected from the storage repository by the controller. If a CV exceeds a threshold value, then the process proceeds to step 808-5. If a CV does not exceed a threshold value, then the process proceeds to step 808-4.

In step 808-4, a control signal is generated and sent. The control signal can be generated and sent by the controller. The control signal can be a notification, evaluation, and/or instruction to an actuator and/or other component of the system that, in this case, that there is no problem detected. For example, the control signal can be a notification to a user (e.g., user 170) that no corrosion conditions within the enclosure have been detected. When step 808-4 is complete, the process proceeds to the END step.

In step 808-5, additional field values are obtained. The additional field values can be obtained by one or more sensors at the direction of the controller. For example, a camera (sensor) within the enclosure (field device) can be used to capture visual images (field values) of the interior of the enclosure. In such a case, the controller can move the direction of the camera so that the areas of possible corrosion, as determined by the controller, can be captured.

In step 808-6, a control signal is generated and sent. The control signal of step 808-6 can be the same as (e.g., in terms of type of control signal, in terms of what component of the system receives the control signal, in terms of the content of the control signal), or different than, the control signal of step 808-4. The control signal can be generated and sent by the controller. The control signal can be a notification, evaluation, and/or instruction to an actuator and/or other component of the system that, in this case, there is possible corrosion in the enclosure. For example, the control signal can be a notification to a user that the enclosure likely has corrosion inside. As another example, the control signal can activate a fan (or other air moving device), moisture pump, or other control device that can control moisture within the enclosure to begin operating to remove the condensation within the enclosure.

In step 808-7, a determination is made as to whether a user agrees that there is corrosion within the enclosure. The determination is made by a user and communicated to the controller. If the user agrees that there is corrosion within the enclosure, then the process proceeds to step 808-9. If the user does not agree that there is corrosion within the enclosure, then the process proceeds to step 808-8.

In step 808-8, a control signal is generated and sent. The control signal of step 808-8 can be the same as (e.g., in terms of type of control signal, in terms of what component of the system receives the control signal, in terms of the content of the control signal), or different than, the control signals of step 808-4 and 808-6. The control signal can be generated and sent by the controller. The control signal can be a notification, evaluation, and/or instruction to an actuator and/or other component of the system that, in this case, an algorithm should be adjusted because the user disagrees that there is a corrosion problem in the enclosure. For example, the control signal can be a reduction of the threshold value (as determined by the controller). When step 808-8 is complete, the process proceeds to the END step.

In step 808-9, a control signal is generated and sent. The control signal of step 808-9 can be the same as (e.g., in terms of type of control signal, in terms of what component of the system receives the control signal, in terms of the content of the control signal), or different than, the control signals of step 808-4, 808-6, and 808-8. The control signal can be generated and sent by the controller. The control signal can be a notification, evaluation, and/or instruction to an actuator and/or other component of the system that, in this case, there is a corrosion problem in the enclosure that must be fixed. For example, the control signal can send a notification to the user to fix the corrosion problem. As another example, the control signal can be an increase of the threshold value (as determined by the controller), so that corrosion is more likely to be found in the enclosure in the future until the problem is corrected by the user. When step 808-9 is complete, the process proceeds to the END step.

In FIG. 9, the method 900 begins at the START step and proceeds to step 909-1, where a water level within an enclosure is measured. The water level is a field value that is measured by at least one sensor. The enclosure is a field device (e.g., field device 140). The water level can be sent from the sensor to the controller (e.g. controller 410), and the controller can determine which sensors are reading the water level and when the water level is read.

In step 909-2, a determination is made as to whether the water level in the enclosure exceeds a threshold value. The determination can be made by the controller. The threshold value can be selected from the storage repository by the controller. If the water level in the enclosure does not exceed the threshold value, then the process proceeds to step 909-3. If the water level in the enclosure exceeds the threshold value, then the process proceeds to step 909-4.

In step 909-3, a control signal is generated and sent. The control signal can be generated and sent by the controller. The control signal can be a notification, evaluation, and/or instruction to an actuator and/or other component of the system that, in this case, that there is no problem detected. For example, the control signal can be a notification to a user (e.g., user 170) that there is no standing water within the enclosure. When step 909-3 is complete, the process proceeds to the END step.

In step 909-4, a determination is made as to whether the water level in the enclosure exceeds a second threshold value. The determination can be made by the controller. The second threshold value can be greater than the threshold value of step 909-2 and can be selected from the storage repository by the controller. If the water level in the enclosure does not exceed the second threshold value, then the process proceeds to step 909-6. If the water level in the enclosure exceeds the threshold value, then the process proceeds to step 909-5.

In step 909-5, a control signal is generated and sent. The control signal of step 909-5 can be the same as (e.g., in terms of type of control signal, in terms of what component of the system receives the control signal, in terms of the content of the control signal), or different than, the control signal of step 909-3. The control signal can be generated and sent by the controller. The control signal can be a notification, evaluation, and/or instruction to an actuator and/or other component of the system that, in this case, there is a high level of standing water in the enclosure. For example, the control signal can be a notification to a user (e.g., user 170) that there is a high level of standing water within the enclosure. As another example, the control signal can open a valve at the bottom of the enclosure, allowing at least some of the water in the enclosure to drain. When step 909-5 is complete, the process proceeds to the END step.

In step 909-6, a differential in the water level in the enclosure is determined. The differential in water level can be with respect to one or more factors, including but not limited to location of multiple sensors in the enclosure and time. In this example, the differential is a difference in water level with respect to time as measured by the same sensor. As a result, the differential gives an indication as to whether the actions initiated by the controller to reduce the water level in the enclosure is working. The differential in the water level can be determined by the controller. As with step 909-1, the additional water level reading can be sent from the sensor to the controller, and the controller can determine which sensors are reading the water level and when the water level is read.

In step 909-7, a determination is made as to whether the differential in water level in the enclosure exceeds another threshold value. The determination can be made by the controller. The threshold value can be different than the threshold values of step 909-2 and step 909-4. The threshold value can be selected from the storage repository by the controller. If the differential in water level in the enclosure does not exceed the threshold value, then the process proceeds to step 909-9. If the differential in water level in the enclosure exceeds the threshold value, then the process proceeds to step 909-8.

In step 909-8, a control signal is generated and sent. The control signal of step 909-8 can be the same as (e.g., in terms of type of control signal, in terms of what component of the system receives the control signal, in terms of the content of the control signal), or different than, the control signal of steps 909-3 and 909-5. The control signal can be generated and sent by the controller. The control signal can be a notification, evaluation, and/or instruction to an actuator and/or other component of the system that, in this case, the water level in the enclosure is back to an acceptable level. For example, the control signal can be a notification to a user that the action taken by the controller in step 909-5 has worked in reducing the amount of standing water within the enclosure. As another example, the control signal can close the valve that was opened in step 909-5. When step 909-8 is complete, the process proceeds to the END step.

In step 909-9, a control signal is generated and sent. The control signal of step 909-9 can be the same as (e.g., in terms of type of control signal, in terms of what component of the system receives the control signal, in terms of the content of the control signal), or different than, the control signals of step 909-3, 909-5, and 909-8. The control signal can be generated and sent by the controller. The control signal can be a notification, evaluation, and/or instruction to an actuator and/or other component of the system that, in this case, the water level in the enclosure is still at an unacceptable level. For example, the control signal can be a notification to a user that the action taken by the controller in step 909-5 did not reduce the amount of standing water within the enclosure. As another example, the control signal can be a notification to a user that the valve that was opened in step 909-5 is clogged and needs to be inspected. When step 909-9 is complete, the process proceeds to the END step.

In FIG. 10, the method 1000 begins at the START step and proceeds to step 1081-1, where a measurement is made for a combustible gas. The measurement is a field value that is measured by at least one gas detector (a sensor). The measurement can be made in or near an enclosure or some other field device (e.g., field device 140). The measurement can be sent from the sensor to the controller (e.g. controller 410). The controller can determine which sensors are measuring the level of combustible gas, what combustible gas is being measured, and when the measurement is taken.

In step 1081-2, a determination is made as to whether the combustible gas is present. In a more general sense, a determination is made as to whether the amount of combustible gas exceeds a threshold value. The determination can be made by the controller. The threshold value can be selected from the storage repository by the controller. If the amount of combustible gas does not exceed the threshold value, then the process proceeds to step 1081-3. If the amount of combustible gas exceeds the threshold value, then the process proceeds to step 1081-4.

In step 1081-3, a control signal is generated and sent. The control signal can be generated and sent by the controller. The control signal can be a notification, evaluation, and/or instruction to an actuator and/or other component of the system that, in this case, that there is no problem detected. For example, the control signal can be a notification to a user (e.g., user 170) that there is no amount of the combustible gas detected in a certain area. When step 1081-3 is complete, the process proceeds to the END step.

In some cases, a control and monitoring function can be initiated at this point to continue monitoring for the presence of combustible gas, while also monitoring for the presence of some other condition (e.g., a compromised flame path). In this way, the controller can limit the operation of a field device (e.g., prevent breaker contacts from opening) in order to in order to prevent a potentially adverse condition (e.g., arcing from the breaker operation, which can be a source of ignition to combustible gas) from occurring. In addition, or in the alternative, example embodiments can control one field device to reduce the effects of another field device (e.g., turn on a blower and direct the blower toward electrical terminals that are showing a high temperature), thus removing the field device as a source of ignition where combustible gas may be present.

In step 1081-4, a determination is made as to whether there is a loose electrical connection or other sources of arcing in the proximity of where the combustible gas is detected. The determination can be made by the controller. The loose electrical connection or other sources of arcing can be measured as field values by one or more sensors. These sensors can be selected by the controller, and the controller can determine when these sensors measure for field values associated with a loose electrical connection or other sources of arcing in proximity to where the combustible gas is detected. If there is a loose electrical connection or other sources of arcing in the proximity of where the combustible gas is detected, then the process proceeds to step 1081-5. If there is no loose electrical connection or other sources of arcing in the proximity of where the combustible gas is detected, then the process proceeds to step 1081-6.

In step 1081-5, a control signal is generated and sent. The control signal of step 1081-5 can be the same as (e.g., in terms of type of control signal, in terms of what component of the system receives the control signal, in terms of the content of the control signal), or different than, the control signal of step 1081-3. The control signal can be generated and sent by the controller. The control signal can be a notification, evaluation, and/or instruction to an actuator and/or other component of the system that, in this case, there is a risk of combustion. For example, the control signal can be a notification to a user (e.g., user 170) that there is a risk of combustion in the area where the combustible gas was detected. As another example, the control signal can stop power delivered to the circuitry in the area where the combustible gas is detected. As yet another example, the control signal can prevent a trip and/or actuation of a field device when a flame path is compromised. When step 1081-5 is complete, the process proceeds to the END step.

In step 1081-6, one or more temperatures are read. The temperatures are field values that are measured by at least one sensor (e.g., a thermostat, a thermometer). The equipment in or near which the temperatures are measured are each a field device (e.g., field device 140). The temperatures can be sent from the sensor to the controller (e.g. controller 410), and the controller can determine which sensors are reading the temperatures and when those temperatures are read.

In step 1081-7, a determination is made as to whether any of the temperatures measured in step 1087-6 is at or above the combustion point of the combustible gas. In a more general sense, a determination is made as to whether any of the temperatures measured in step 1087-6 exceeds a threshold value. The determination can be made by the controller. The threshold value can be selected from the storage repository by the controller. If any of the temperatures measured in step 1087-6 does not exceed the threshold value, then the process proceeds to step 1081-8. If any of the temperatures measured in step 1087-6 exceeds the threshold value, then the process proceeds to step 1081-5.

In step 1081-8, one or more infrared images are taken. The infrared images are field values (or can be used to derive field values) that are measured by at least one sensor (e.g., an IR measurement device). The equipment in or near which the infrared images are taken are each a field device. The infrared images can be sent from the sensor to the controller, and the controller can determine which sensors are reading the temperatures and when those temperatures are read. In addition, the controller can move the sensor to specify a location and/or part of a field device for which the infrared images are to be taken.

In step 1081-9, a determination is made as to whether the temperature of any of the "hot spots" in the infrared images are at or above the combustion point of the combustible gas. In a more general sense, a determination is made as to whether the temperature of any of the "hot spots" in the infrared images exceeds a threshold value. The determination can be made by the controller. The threshold value can be selected from the storage repository by the controller. If the temperature of any of the "hot spots" in the infrared images does not exceed the threshold value, then the process proceeds to step 1081-10. If the temperature of any of the "hot spots" in the infrared images exceeds the threshold value, then the process proceeds to step 1081-11.

In step 1081-10, a control signal is generated and sent. The control signal of step 1081-10 can be the same as (e.g., in terms of type of control signal, in terms of what component of the system receives the control signal, in terms of the content of the control signal), or different than, the control signals of step 1081-3 and step 1081-5. The control signal can be generated and sent by the controller. The control signal can be a notification, evaluation, and/or instruction to an actuator and/or other component of the system that, in this case, that there is no imminent problem detected. For example, the control signal can be a notification to a user that there is a slight risk of combustion in an area, and different ways to mitigate the risk of combustion from developing. When step 1081-10 is complete, the process proceeds to the END step.

In step 1081-11, a control signal is generated and sent. The control signal of step 1081-11 can be the same as (e.g., in terms of type of control signal, in terms of what component of the system receives the control signal, in terms of the content of the control signal), or different than, the control signals of step 1081-3, step 1081-5, and step 1081-10. The control signal can be generated and sent by the controller. The control signal can be a notification, evaluation, and/or instruction to an actuator and/or other component of the system that, in this case, there is a risk of combustion. For example, the control signal can be a notification to a user that there is a risk of combustion in the area where a "hot spot" in an infrared image was detected. As another example, the control signal can stop power delivered to the circuitry in the area where the "hot spot" in the infrared image is detected. When step 1081-11 is complete, the process proceeds to the END step.

In FIG. 11A, the method 1100 begins at the START step and proceeds to step 1182-1, where a panel or door of an enclosure is detected as being open. The detector can be made, for example, by at least one proximity sensor (a sensor). The enclosure is a field device (e.g., field device 140). The detection can be sent from the sensor to the controller (e.g. controller 410). The controller can determine which sensors are used to detect whether the panel is open, and when the measurement is taken.

In step 1182-2, a determination is made as to whether the panel is open for a certain amount of time. In a more general sense, a determination is made as to whether the time that the panel is open exceeds a threshold value. The determination can be made by the controller with the aid of a timer. The threshold value can be selected from the storage repository by the controller. If the time that the panel is open does not exceed the threshold value, then the process proceeds to step 1182-4. If the time that the panel is open exceeds the threshold value, then the process proceeds to step 1182-3.

In step 1182-3, a control signal is generated and sent. The control signal can be generated and sent by the controller. The control signal can be a notification, evaluation, and/or instruction to an actuator and/or other component of the system that, in this case, the panel of the enclosure is open and needs to be closed. For example, the control signal can be a notification to a user (e.g., user 170) that there the panel door of the enclosure has been open for a certain amount of time. When step 1182-3 is complete, the process proceeds to the END step.

In step 1182-4, a control signal is generated and sent. The control signal of step 1182-4 can be the same as (e.g., in terms of type of control signal, in terms of what component of the system receives the control signal, in terms of the content of the control signal), or different than, the control signal of step 1182-3. The control signal can be generated and sent by the controller. The control signal can be a notification, evaluation, and/or instruction to an actuator and/or other component of the system that, in this case, that the panel of the enclosure is securely closed. For example, the control signal can be a notification to a user that the mechanical integrity of the enclosure appears sound. When step 1182-4 is complete, the process proceeds to the END step.

In FIG. 11B, the method 1101 begins at the START step and proceeds to step 1183-1, where a panel or door of an enclosure is detected as moving from an open position to a closed position. The detector can be made, for example, by at least one proximity sensor (a sensor). The enclosure is a field device (e.g., field device 140). The detection can be sent from the sensor to the controller (e.g. controller 410). The controller can determine which sensors are used to detect whether the panel is moving from the open position to the closed position, and when the measurement is taken.

In step 1183-2, a determination is made as to whether the panel is secured (stops moving) for a certain amount of time. In a more general sense, a determination is made as to whether the time that the panel is secure exceeds a threshold value. The determination can be made by the controller with the aid of a timer. The threshold value can be selected from the storage repository by the controller. If the time that the panel is secure does not exceed the threshold value, then the process repeats step 1183-2. If the time that the panel is secure exceeds the threshold value, then the process proceeds to step 1183-3.

In step 1183-3, a determination is made as to whether the panel is closed. The determination can be made by the controller with the aid of at least one sensor (e.g., a proximity sensor). The detection of whether the panel is closed can be sent from the sensor to the controller. The controller can determine which sensors are used to detect whether the panel is closed, and when the measurement is taken. If the time that the panel is closed, then the process proceeds to step 1183-4. If the time that the panel is not closed, then the process proceeds to step 1183-5.

In step 1183-4, a control signal is generated and sent. The control signal can be generated and sent by the controller. The control signal can be a notification, evaluation, and/or instruction to an actuator and/or other component of the system that, in this case, the panel of the enclosure is unsecured and needs to be secured. For example, the control signal can be a notification to a user (e.g., user 170) that the latch for the panel of the enclosure is not engaged with the panel. When step 1183-4 is complete, the process proceeds to the END step.

In step 1183-5, a control signal is generated and sent. The control signal of step 1183-5 can be the same as (e.g., in terms of type of control signal, in terms of what component of the system receives the control signal, in terms of the content of the control signal), or different than, the control signal of step 1183-4. The control signal can be generated and sent by the controller. The control signal can be a notification, evaluation, and/or instruction to an actuator and/or other component of the system that, in this case, that the panel of the enclosure is securely closed. For example, the control signal can be a notification to a user that the mechanical integrity of the enclosure appears sound. When step 1183-5 is complete, the process proceeds to the END step.

In FIG. 11C, the method 1102 begins at the START step and proceeds to step 1184-1, where a panel or door of an enclosure is detected as being secured in a closed position. The detector can be made, for example, by at least one proximity sensor (a sensor). The enclosure is a field device (e.g., field device 140). In this particular example, the enclosure can be a special type of enclosure, such as an explosion-proof enclosure. The detection can be sent from the sensor to the controller (e.g. controller 410). The controller can determine which sensors are used to detect whether the panel is secured in the closed position, and when the measurement is taken.

In step 1184-2, a determination is made as to whether the flame path integrity has been compromised. The determination can be made by the controller with the aid of one or more sensors. The measure of the flame path integrity (a field value) can be sent from the sensor to the controller. The measure of the flame path integrity can be compared to a threshold value. The threshold value can be selected from the storage repository by the controller. The controller can determine which sensors are used to measure the flame path integrity, and when the measurement is taken. If the flame path integrity has been compromised, then the process proceeds to step 1184-3. If the flame path integrity has not been compromised, then the process proceeds to step 1184-4.

In step 1184-3, a control signal is generated and sent. The control signal can be generated and sent by the controller. The control signal can be a notification, evaluation, and/or instruction to an actuator and/or other component of the system that, in this case, the flame path of the enclosure is insufficient (too large or too small). For example, the control signal can be a notification to a user (e.g., user 170) that the flame path of the enclosure represent a safety hazard. When step 1184-3 is complete, the process proceeds to the END step.

In step 1184-4, a control signal is generated and sent. The control signal of step 1182-4 can be the same as (e.g., in terms of type of control signal, in terms of what component of the system receives the control signal, in terms of the content of the control signal), or different than, the control signal of step 1184-3. The control signal can be generated and sent by the controller. The control signal can be a notification, evaluation, and/or instruction to an actuator and/or other component of the system that, in this case, that the flame path of the enclosure is properly set. For example, the control signal can be a notification to a user that the mechanical integrity of the enclosure appears sound. When step 1183-4 is complete, the process proceeds to the END step.

A health score for a system or portion thereof can be performed using example embodiments. The health score can be useful when a major adverse condition or event is experienced by the system. An example of determining a health score is captured by the method 1200 of FIG. 12, which begins at the START step and proceeds to step 1286-1, where a number of field values are measured. Implied in this step 1286-1 is that a significant condition (e.g., deteriorated breaker, corrosion detected, flame path integrity of an enclosure compromised, loose electrical connection detected) or event (e.g., explosion, trip) has recently been detected or has recently occurred.

Each field value is measured by at least one sensor (e.g., a thermostat, a volt meter, a water level detector). The equipment in or near which the field values are measured are each a field device (e.g., field device 140). The field values can be sent from the sensor to the controller (e.g. controller 410), and the controller can determine which sensors are used to read which field values, and when those field values are to be measured. The scope of field values and field devices that are part of the health score can be determined by the controller based on one or more of a number of factors, including but not limited to the adverse condition or event detected.

In step 1286-2, one or more evaluated values are calculated. The evaluated values can be calculated by the controller. The controller can calculate the evaluated values using data (e.g., the field values from step 1286-1) about the field devices, one or more algorithms, and/or any other suitable data, all of which can be stored in the storage repository. For example, as part of an algorithm, a constant or algorithm can be periodically updated based on data collected over time. As a specific example, a constant or algorithm for the evaluation of corrosive activity in an enclosure can be updated on a daily basis based on daily information captured and the trend of data over time. The constant or algorithm can be used in conjunction with the field values measured in step 1286-1 to determine the evaluated values for the present time period. In some cases, a field value can be the same as an evaluated value.

In step 1286-3, a health score is calculated. The health score is calculated by the controller. The health score can be determined using one or more algorithms, weighting factors, constant values, and/or any other suitable factors. Updating a health score can be performed periodically, automatically, continuously, upon the occurrence of some event (e.g., an explosion), and/or at any other point in time. The health score can provide the user with a way to assess the condition of field device, a subsystem that includes the field device, and/or the system after an adverse condition has been detected or an adverse event has occurred. The health score can provide an immediate damage assessment of the system to the user, helping with maintenance scheduling, budgeting (operations and maintenance expenditures, capital expenditures), inventory, parts replenishment, purchase order generation to an approved supplier, and/or other aspects of getting the system or portions thereof back to an improved form of operations.

In step 1286-4, a control signal is generated and sent. The control signal can be generated and sent by the controller.

The control signal can be a notification, evaluation, and/or instruction to an actuator and/or other component of the system that, in this case, indicates the health score of the system or portion thereof. For example, the control signal can be a notification to a user (e.g., user 170) that an enclosure and associated wiring must be replaced because of a fire caused within the enclosure. When step 1286-4 is complete, the process proceeds to the END step. In some cases, a health score and a safety score can be used interchangeably herein.

For any method described expressly or inherently herein, before ending the process of such method, the controller can use the information gathered during the method, along with historical data, to update a safety score of a field device, a subsystem that includes the field device, and/or the system. The safety score can be determined using one or more algorithms, weighting factors, constant values, and/or any other suitable factors.

The safety score provides the user with an indication of how the various field devices are performing in light of their history and operating environment. Updating a safety score can be performed periodically, automatically, continuously, upon the occurrence of some event, and/or at any other point in time. The safety score can provide the user with assistance in maintenance scheduling, budgeting (operations and maintenance expenditures, capital expenditures), inventory, and/or other aspects of managing the system or portions thereof.

An example of determining a safety score is captured by the method 1300 of FIG. 13, which begins at the START step and proceeds to step 1387-1, where a number of field values are measured. Each field value is measured by at least one sensor (e.g., a thermostat, a volt meter, a water level detector). The equipment in or near which the field values are measured are each a field device (e.g., field device 140). The field values can be sent from the sensor to the controller (e.g. controller 410), and the controller can determine which sensors are used to read which field values, and when those field values are to be measured. The scope of field values and field devices that are part of the safety score can be determined by the controller based on one or more of a number of factors, including but not limited to a user request and a scheduled reporting period.

In step 1387-2, one or more evaluated values are calculated. The evaluated values can be calculated by the controller. The controller can calculate the evaluated values using data (e.g., the field values from step 1387-1) about the field devices, one or more algorithms, and/or any other suitable data, all of which can be stored in the storage repository. For example, as part of an algorithm, a constant or algorithm can be periodically updated based on data collected over time. As a specific example, a constant or algorithm for the evaluation of corrosive activity in an enclosure can be updated on a daily basis based on daily information captured and the trend of data over time. The constant or algorithm can be used in conjunction with the field values measured in step 1387-1 to determine the evaluated values for the present time period. In some cases, a field value can be the same as an evaluated value.

In step 1387-3, a determination is made as to whether any of the evaluated values exceeds a critical threshold value. The determination can be made by the controller. The critical threshold values are threshold values that indicate that a critical condition or event is imminent. The critical threshold values can be selected from the storage repository by the controller. If none of the evaluated values exceed an associated critical threshold value, then the process proceeds to step 1387-6. If at least one of the evaluated values exceeds an associated critical threshold value, then the process proceeds to step 1387-4.

In step 1387-4, a health score is calculated. The health score is calculated by the controller. The health score can be determined using one or more algorithms, weighting factors, constant values, and/or any other suitable factors. As discussed above, the health score can provide the user with a way to assess the condition of field device, a subsystem that includes the field device, and/or the system after an adverse condition has been detected or an adverse event has occurred. The health score can provide an immediate damage assessment of the system to the user, helping with maintenance scheduling, budgeting (operations and maintenance expenditures, capital expenditures), inventory, and/or other aspects of getting the system or portions thereof back to an improved form of operations.

In step 1387-5, a control signal is generated and sent. The control signal can be generated and sent by the controller. The control signal can be a notification, evaluation, and/or instruction to an actuator and/or other component of the system that, in this case, indicates the health score of the system or portion thereof. For example, the control signal can be a notification to a user (e.g., user 170) that certain wiring within an enclosure must be tightened and water that has pooled at the bottom of the enclosure must be removed immediately. When step 1387-5 is complete, the process proceeds to the END step.

In step 1387-6, the evaluated values are compared with normal threshold values. The comparison can be made by the controller. The normal threshold values are threshold values that indicate that a non-critical condition or event is developing. The normal threshold values can be selected from the storage repository by the controller. In step 1387-7, a control signal is generated and sent. The control signal of step 1387-7 can be the same as (e.g., in terms of type of control signal, in terms of what component of the system receives the control signal, in terms of the content of the control signal), or different than, the control signal of step 1387-5.

The control signal can be generated and sent by the controller. The control signal can be a notification, evaluation, and/or instruction to an actuator and/or other component of the system that, in this case, the system or portion thereof is operating normally and without detected problems. Alternatively, if an evaluated value exceeds a normal threshold value, the control signal can describe a maintenance item that should be scheduled. For example, the control signal can be a notification to a user that a breaker should be scheduled for an overhaul in the next six months. As another example, the control signal can operate a vent fan in an area where a small amount of combustible gas was detected. When step 1387-7 is complete, the process proceeds to the END step.

Figure 14:
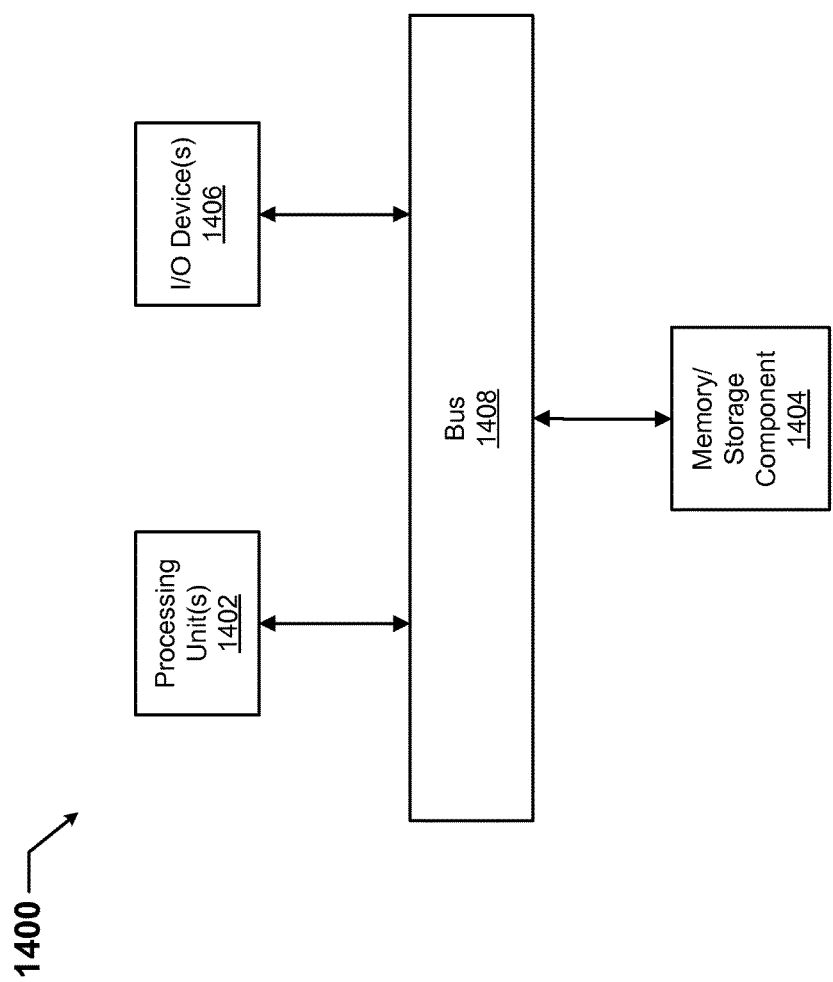
FIG. 14 shows a computing device in accordance with one or more example embodiments.

One or more of the functions performed by any of the components of the system 100 can be performed using a computing device. An example of a computing device 1400 is shown in FIG. 14. The computing device 1400 implements one or more of the various techniques described herein, and which is representative, in whole or in part, of the elements described herein pursuant to certain example embodiments. Computing device 1400 is one example of a computing device and is not intended to suggest any limitation as to scope of use or functionality of the computing device and/or its possible architectures. Neither should computing device 1400 be interpreted as having any dependency or requirement relating to any one or combination of components illustrated in the example computing device 1400.

Computing device 1400 includes one or more processors or processing units 1402, one or more memory/storage components 1404, one or more input/output (I/O) devices 1406, and a bus 1408 that allows the various components and devices to communicate with one another. Bus 1408 represents one or more of any of several types of bus structures, including a memory bus or memory controller, a peripheral bus, an accelerated graphics port, and a processor or local bus using any of a variety of bus architectures. Bus 1408 includes wired and/or wireless buses.

Memory/storage component 1404 represents one or more computer storage media. Memory/storage component 1404 includes volatile media (such as random access memory (RAM)) and/or nonvolatile media (such as read only memory (ROM), flash memory, optical disks, magnetic disks, and so forth). Memory/storage component 1404 includes fixed media (e.g., RAM, ROM, a fixed hard drive, etc.) as well as removable media (e.g., a Flash memory drive, a removable hard drive, an optical disk, and so forth).

One or more I/O devices 1406 allow a customer, utility, or other user to enter commands and information to computing device 1400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 1400 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 1400 includes at least the minimal processing, input, and/or output means necessary to practice one or more embodiments.

Further, those skilled in the art will appreciate that one or more elements of the aforementioned computer device 1400 is located at a remote location and connected to the other elements over a network in certain example embodiments. Further, one or more embodiments is implemented on a distributed system having one or more nodes, where each portion of the implementation (e.g., controller 410) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Example embodiments provide a number of benefits. Examples of such benefits include, but are not limited to, reduced downtime of equipment, lower maintenance costs, avoidance of catastrophic failure, prognosis of equipment failure, improved maintenance planning, specific locations where maintenance is required, improved efficiency of one or more devices and/or other portions of an example system, extended useful life of one or more components of an example system, and reduced cost of labor and materials.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An enclosure diagnostic and control system, comprising:
   a controller comprising a storage repository, wherein the storage repository comprises at least one threshold value and at least one algorithm;
   an enclosure communicably coupled to the controller and electrically coupled to a field device, wherein the enclosure and the field device are located in a hazardous environment;
   a plurality of sensors communicably coupled to the controller, wherein the plurality of sensors measure a plurality of field values of a plurality of parameters associated with the field device, wherein at least some of the plurality of parameters indirectly affect a current performance of the field device; and
   at least one actuator communicably coupled to the controller, wherein the at least one actuator changes a state of the field device,
   wherein the controller evaluates the plurality of field values using a plurality of historical field values measured by the plurality of sensors, nameplate information for the field device, historical information of the field device, and the at least one algorithm to generate a safety score of the field device, wherein the safety score indicates a need of maintenance to improve future performance of the field device based on the current performance relative to historical performance of the field device, wherein the controller determines whether the safety score falls outside a range of acceptable values, wherein the controller outputs a control signal to the at least one actuator based on the safety score, wherein the at least one actuator, based on the control signal, controls a current operation of the field device by changing the state of the field device to eliminate a cause of the safety score falling outside the range of acceptable values, thereby improving the safety score and the future performance of the field device without directly affecting an ambient environment surrounding the field device.

2. The system of claim 1, further comprising:
a user system communicably coupled to the controller, wherein the controller sends a notification to the user system when the control signal is output by the controller to the at least one actuator.

3. The system of claim 1,
wherein the at least one actuator further operates a control device disposed within the enclosure, wherein the control device, when operating, alleviates a condition within the enclosure that causes the safety score to fall outside the range of acceptable values.

4. The system of claim 1, wherein the control signal notifies a user based on the safety score.

5. The system of claim 4, wherein the user is part of a user system communicably coupled to the controller.

6. The system of claim 1, wherein the field device is located within the enclosure.

7. The system of claim 1, wherein at least one of the plurality of sensors is located within the enclosure.

8. The system of claim 1, wherein the enclosure is located in a substantially naturally-controlled environment.

9. The system of claim 1, wherein the safety score indicates maintenance needs and reliability of the field device.

10. The system of claim 1, wherein the control signal further provides maintenance actions required to improve the future performance of the field device, and wherein the maintenance actions provided in the control signal, when performed by a user on the field device, improve the future performance of the field device.

11. The system of claim 1, wherein the controller determines that the safety score falls below a minimum value of the range of acceptable values.

12. The system of claim 1, wherein the controller determines that the safety score rises above a maximum value of the range of acceptable values.

13. An enclosure diagnostic and control system, comprising:
a controller comprising a storage repository, wherein the storage repository comprises a plurality of threshold values;
a plurality of enclosures communicably coupled to the controller and electrically coupled to a plurality of field devices, wherein the plurality of enclosures and the plurality of field devices are located in a hazardous environment;
a plurality of sensors communicably coupled to the controller, wherein the plurality of sensors measure a plurality of field values of a plurality of parameters associated with the plurality of field devices, wherein at least some of the plurality of parameters indirectly affect a current performance of the plurality of field devices; and,
at least one actuator communicably coupled to the controller, wherein the at least one actuator changes a state of at least a prioritized subset of field devices,
wherein the controller evaluates the plurality of field values using a plurality of historical field values measured by the plurality of sensors, nameplate information for the plurality of field devices, and historical information of the plurality of field devices to generate a plurality of safety scores for the plurality of field devices, wherein each of the plurality of safety scores corresponds to one of the plurality of field devices,
wherein the controller evaluates the plurality of safety scores and identifies, based on evaluating the plurality of safety scores, a prioritized subset of safety scores for the prioritized subset of field devices, wherein the prioritized subset of safety scores is identified based on whether each of the plurality of safety scores falls outside a range of acceptable values,
wherein the controller sends a first control signal to the at least one actuator, wherein the at least one actuator, based on the first control signal, controls a current operation of the prioritized subset of field devices by changing the state of at least one field device of the prioritized subset of field devices to eliminate a cause of a safety score of the prioritized subset of field devices falling outside the range of acceptable values, thereby improving the safety score of the prioritized subset of field devices and improve future performance of the prioritized subset of field devices without directly affecting an ambient environment surrounding the subset of field devices.

14. The system of claim 13, wherein the controller sends a second control signal to a user, wherein the second control signal comprises a maintenance plan for a prioritized subset of field devices, wherein the prioritized subset of field devices corresponds to the prioritized subset of safety scores, wherein the maintenance plan comprises specific maintenance actions that are required to improve future performance of the prioritized subset of field devices without directly affecting an ambient environment surrounding the subset of field devices.

15. The system of claim 13, wherein the prioritized subset of field devices comprises at least one of the plurality of field devices.

* * * * *